United States Patent [19]
Yamashita et al.

[11] Patent Number: 5,395,201
[45] Date of Patent: Mar. 7, 1995

[54] CONTAINER AND CONTAINER CARRIER WITH PISTON-CYLINDER DEVICES FOR LIFTING CONTAINERS ON TO, OFF AND ALONG THE CARRIER

[75] Inventors: Megumi Yamashita; Takashi Yoneda; Takashi Asakura, all of Nishinomiya, Japan

[73] Assignee: Kyokuto Kaihatsu Kogyo Co., Ltd., Japan

[21] Appl. No.: 907,244

[22] Filed: Jul. 1, 1992

Related U.S. Application Data

[62] Division of Ser. No. 623,440, Dec. 13, 1990, Pat. No. 5,169,194.

[51] Int. Cl.⁶ .............................. B60P 1/04; B66B 9/20
[52] U.S. Cl. .................................. 414/467; 187/226; 414/540; 414/542; 414/544
[58] Field of Search ................. 414/622-623, 414/540, 541, 542, 544, 467, 486, 495, 496, 498, 618-619, 608, 664, 668, 798.2, 798.9, 797.4, 798.1, 607, 606, 631, 627, 737; 187/9 E, 20, 26, 9 R; 294/68.3, 81.21, 81.56; 901/13, 49

[56] References Cited

U.S. PATENT DOCUMENTS

| | | | |
|---|---|---|---|
| 2,437,806 | 3/1948 | Dempster | 414/544 |
| 2,937,879 | 5/1960 | Lion | 220/1.5 X |
| 3,272,364 | 7/1966 | Mindrum et al. | 414/622 |
| 3,476,275 | 11/1969 | Cowlishaw et al. | 414/498 |
| 3,586,189 | 6/1971 | Tornheim | 414/498 X |
| 3,606,053 | 9/1971 | Whiteman | 294/81.21 |
| 3,901,392 | 8/1975 | Streckert | 901/13 |
| 3,987,913 | 10/1976 | Lickfold | 414/544 |
| 4,395,189 | 7/1983 | Munten | 414/635 |
| 4,429,730 | 2/1984 | Elston | 220/1.5 X |
| 4,456,414 | 6/1984 | Williams | |
| 4,599,032 | 7/1986 | Haus, Jr. | 414/542 |
| 4,921,075 | 5/1990 | Schumacher et al. | 187/9 E |

FOREIGN PATENT DOCUMENTS

| | | | |
|---|---|---|---|
| 0251219 | 1/1988 | European Pat. Off. | |
| 1106182 | 12/1955 | France | 414/622 |
| 1316425 | 12/1962 | France | 414/627 |
| 2041574 | 2/1972 | Germany | |
| 2645025 | 4/1978 | Germany | 414/498 |
| 99436 | 4/1990 | Japan | 414/541 |
| 1341767 | 12/1973 | United Kingdom | |
| 1503210 | 3/1978 | United Kingdom | |
| 2111940 | 7/1983 | United Kingdom | 414/622 |
| 1100161 | 6/1984 | U.S.S.R. | 414/540 |
| 1370060 | 1/1988 | U.S.S.R. | 414/540 |
| 8100097 | 1/1981 | WIPO | 414/607 |

*Primary Examiner*—Michael S. Huppert
*Assistant Examiner*—R. B. Johnson
*Attorney, Agent, or Firm*—Wenderoth, Lind & Ponack

[57] ABSTRACT

A container 1 has a support member 3 which ascends and descends freely and is provided at back of a container body 2, a top connecting member 11 which is fixed at front of the container body 2 and can couple and decouple with a carrier 45, a bottom connecting member 16 which is provided at the front of the container body 2 so as to be able to move and which couples and decouples with the carrier 45, and transmitting members 21, 40 which transmit the movement of the bottom connecting member 16 to the support member 3 and raise and lower the support member 3. When this container 1 is loaded on the carrier 45, it is possible to synchronize the front and back of the container body 2 so that the container 1 remains level by raising the front of the container 1 by lifting the top connecting member 11 at the front of the container body 2 by a member 61 of the carrier 45, and holding the bottom connecting member 16 at the front of the container 1 fixed with respect to the ground, transferring the motion of the bottom connecting member 16 relative to the container body 2 to the support member 3 at the back of the container 1 by the transmitting members 21, 40, and extending the support member 3 at the back of the container 1 down to raise the back of the container 1.

2 Claims, 29 Drawing Sheets

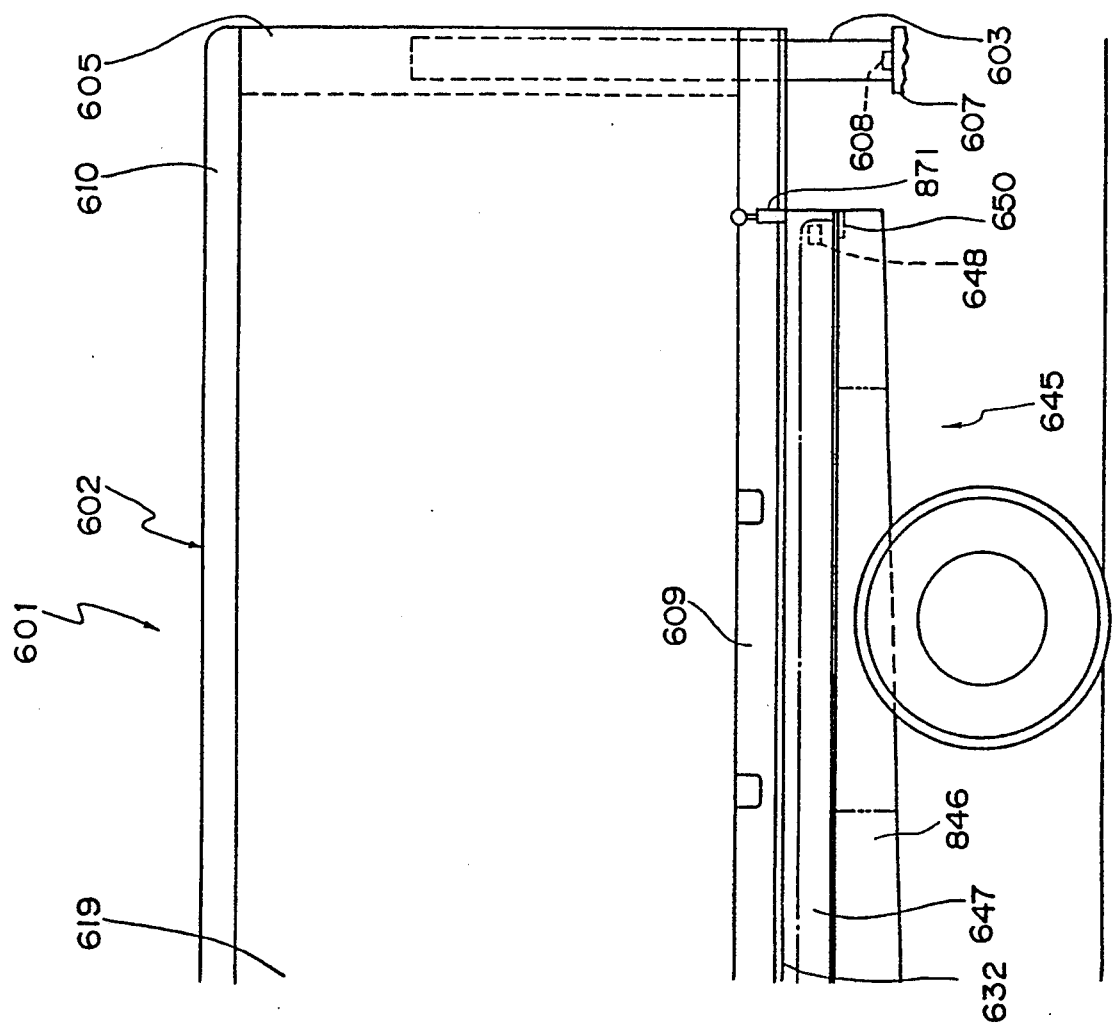

CONTAINER AND CONTAINER CARRIER WITH PISTON-CYLINDER DEVICES FOR LIFTING CONTAINERS ON TO, OFF AND ALONG THE CARRIER

This is a Rule 1.60 division of application Ser. No. 07/623,440, filed Dec. 13, 1990, now U.S. Pat. No. 5,169,194.

FIELD OF TECHNOLOGY

The present invention relates to a container carrier and a container which can be loaded and unloaded from the carrier while retaining a horizontal posture.

BACKGROUND OF THE INVENTION

There is disclosed in Japanese patent S52-57615 a conventional container carrier. This container carrier comprises an articulated loading arm provided on the carrier body, and a container provided on the top front with an engaging member which catches on a hook on the end of the loading arm. When the container is loaded onto the carrier, the hook on the end of the loading arm engages the engaging member on the front of the container, and lifts the container up onto the body at an angle. When the container is unloaded, it is similarly lowered at an angle from the carrier to the ground by the loading arm.

However, because the container is diagonal to the horizontal when it is loaded and unloaded from a conventional container carrier as thus described, it cannot be loaded with such articles as pianos, furniture, fragile objects and breakables, tanks containing liquids, and similar goods. Such containers are therefore in practice limited to use with rubbish and other waste materials.

Therefore, the first object of the present invention is to provide a container carrier and a container which can be loaded and unloaded from the carrier while retaining a level attitude, and can therefore be used for the transportation of pianos, furniture, breakables, tanks containing liquids, and similar goods.

In addition, a second object of the present invention is to provide a container carrier and a container which can be loaded and unloaded from the carrier while retaining a horizontal attitude, and in addition can prevent the container from bouncing up from the carrier when bumps and holes in the road are hit during transportation, and is thus able to prevent damage to the container and the carrier, and so enables the driver to relax while driving.

A third object of the present invention is to provide a container carrier from which a container can be loaded and unloaded while retaining a level attitude, and which enables the container to automatically engage and disengage with the carrier.

A fourth object of the present invention is to provide a container carrier from which a container can be loaded and unloaded while retaining a level attitude, and which can prevent operational errors, can prevent the container from sloping even if the operator does err in the operation, and therefore prevents the cargo inside the container from falling over.

SUMMARY OF THE INVENTION

In order to achieve the first object of the present invention, the container according to the present invention comprises a support member which ascends and descends freely on the back of a container body, a top connecting member which is fixed at the front of the container body and can couple and decouple with a carrier, a bottom connecting member which is provided at the front of the container body so as to be movable, and can couple and decouple with the carrier, and transmitting means which convey the movement of the bottom connecting member to the support member and thus raise or lower the support member, whereby it is possible to lift the container body in a roughly level attitude when the bottom connecting member is maintained at a constant height and the top connecting member is raised.

It is preferable to provide, for example, a roller at the bottom end of the support member, or a ground member which contacts the ground and is unmovable.

When the container is loaded on the carrier, it is possible to synchronize the front and back of the container body so that the container remains level by raising the front of the container by lifting the top connecting member at the front of the container body by means of the member of the carrier, and holding, the bottom connecting member at the front of the container fixed with respect to the ground, transferring the motion of the bottom connecting member relative to the container body to the support member at the back of the container by means of the transmitting means, and extending the support member at the back of the container down to raise the back of the container. When the container is raised to approximately the same height as the bed of the carrier, the container can be advanced forward onto the carrier by pulling forward, for example, on the connecting members while supporting the back of the container with the support member on the ground. After this, the support member can be lifted from the ground by operating the bottom connecting member, for example, by a means on the carrier. When this container is lowered to the ground, a level posture can still be maintained by simply reversing the procedure just described.

Furthermore, instead of operating a bottom connecting member to lift the support member from the ground, the support member may also be folded and secured so that it is not supporting the container against the ground.

In addition, by passing the transmitting means through a side frame on the container, the frame size can be enlarged to the maximum limit possible when there are restrictions on the outside dimensions of the container body. As a result, the container capacity can be increased to the maximum limit.

Furthermore, to achieve the first object, a container carrier according to the present invention comprises a container and a carrier, wherein the container comprises a support member which ascends and descends freely on the back of the container body, a container top connecting member provided at the front of the container body, a container bottom connecting member which is provided at the front of the container body so as to be movable upward and downward, and transmitting means which convey the action of the container bottom connecting member to the support member and thus raises and lowers the support member, and the carrier comprises a column device provided so as to be moved forward and back on a carrier body, a carrier top connecting member which is movable upward and downward and which couples and decouples with the container top connecting member, a carrier top connecting member drive means which drives the carrier top connecting member up and down, and a carrier bottom connecting member which is provided on the column device so as to move up and down and couple and decouple with the container bottom connecting member.

When the container is loaded on the carrier, it is possible to synchronize the front and back of the container body so that the container remains level by raising the front of the container via the top connecting member thereon by means of the top connecting member on the carrier, and holding the bottom connecting member at the front of the container fixed with respect to the ground by means of the carrier bottom connecting member, transferring the motion of the container bottom connecting member relative to the container body to the support member at the back of the container by means of the transmitting means, and extending the support member at the back of the container down to raise the back of the container. When the container is raised to approximately the same height as the bed of the truck, the container can be advanced forward onto the carrier by pulling forward, for example, on the connecting members while supporting the back of the container with the support member on the ground. After this, the support member can be lifted from the ground by operating, for example, the bottom connecting member on the container and carrier by a bottom connecting member drive means on the carrier. When this container is lowered to the ground, a level posture can still be maintained by simply reversing the procedure just described.

It is to be noted that when the container is lifted to the same height as the vehicle, the container can also be loaded onto the vehicle by backing the vehicle up instead of pulling forward on the connecting members.

In order to achieve the second object, a container carrier according to the present invention is characterized in that an engaging member having a pin is provided at the center or rear part of one of the container or the carrier, and in the other of the container or the carrier is provided a guide member; this guide member comprises a tapered guide portion, which is provided to guide the pin of the engaging member and raise the carrier body so that the bottom of the container connects with the top of the carrier body when the container is loaded horizontally with an even gap relative to the carrier, and a horizontal contact portion, which is formed in contact with the guide portion and which contacts the pin of the engaging member when the container is loaded completely onto the carrier.

When the container is loaded onto the carrier, by lifting the body so that the guide portion of the guide portion guides the pin of the engaging member and the bottom of the container connects with the top of the body, when the container is completely loaded on the carrier, the pin in the engaging member will be in contact with the contact portion of the guide portion. Specifically, the center or rear parts the container and carrier are coupled together by the guide members and engaging member. On the other hand, the front of the container is coupled firmly to the carrier by the top connecting members on the carrier and container and by the bottom connecting members on the carrier and container. The container is therefore coupled at both front and back to the carrier. As a result, when bumps and holes are hit in the road while driving, the container will not bounce up from the carrier, and damage to the container and carrier does not occur. The driver can therefore relax while driving.

In order to achieve the third object, the container carrier according to the present invention is characterized in that the carrier bottom connecting member comprises a holding member with a U-shaped portion which can accept the engaging member of the container bottom connecting member, and a closing member which can close an opening of the U-shaped portion when the engaging member is enclosed in the holding member, and an operating mechanism which causes the closing member to open or close the opening of the U-shaped portion in connection with the approach or separation of the carrier top connecting member to or from the carrier bottom connecting member.

When the carrier bottom connecting member is in the down position in the column device, and the carrier top connecting member descends and contacts the carrier bottom connecting member, the operating mechanism causes the closing member to open the opening of the U-shaped portion of the holding member in connection with the action of the two connecting members meeting. Thus, the engaging member of the container bottom connecting member easily couples with and separates from the U-shaped portion of the holding member of the carrier bottom connecting member. Also, when the carrier bottom connecting member is in the down position in the column device, and the carrier top connecting member rises and separates from the carrier bottom connecting member, the operating mechanism causes the closing member to close the opening of the U-shaped portion of the holding member in connection with the action of the two connecting members separating. Therefore, when both connecting members are in contact, the engaging member of the container bottom connecting member fitted to the holding member cannot separate from the holding member. Specifically, by driving the carrier bottom connecting member vertically, the top and bottom connecting members are automatically connected or released. Therefore, there is no danger of the container dropping and being damaged when being raised or lowered.

Furthermore, it is preferable that the closing member is a connecting pin, and the above operating mechanism releases the connection of the holding member and the engaging member with the connecting pin in conjunction with the descending action of the carrier top connecting member as it approaches the carrier bottom connecting member when the carrier bottom connecting member is at the lowest position in the column device, and connects the holding member and the engaging member with the connecting pin in conjunction with the ascending action of the carrier top connecting member as it separates from the carrier bottom connecting member when the carrier bottom connecting member is at the lowest position in the column device.

Also, it is possible that the above operating mechanism comprises a spring member, a roller, and a bell crank on the carrier bottom connecting member with first, second, and third arms, wherein the first arm of the bell crank is mounted on the connecting pin, the spring member constantly applies pressure to the second arm of the bell crank, and applies an operating force to the first arm in the direction causing the connecting pin to connect the holding member and the engaging member, and the roller, mounted on the third arm of the bell crank, moves the first arm of the bell crank in the direction which causes the coupling of the holding member and the engaging member to be released by contacting a pressure plate provided at the carrier top connecting member when the carrier top connecting member approaches the carrier bottom connecting member; and when the carrier top connecting member separates from the carrier bottom connecting member, it separates from the pressure plate and permits the connecting pin to connect the holding member and the engaging member.

It is possible for the above operating mechanism comprise an arm provided on the carrier bottom connecting member, a spring member, and an operating pin; one end of the arm is mounted on the carrier bottom connecting member so that it can rotate freely, and the other end is connected to the connecting pin; the spring member applies constant pressure to the other end of the arm in the direction causing the connecting pin to couple the holding member and the engaging member; and the operating pin is mounted vertically with the bottom end at the approximate center of the arm; when the carrier top connecting member descends and approaches the carrier bottom connecting member, the bottom of the carrier top connecting member contacts the operating pin, and the aforementioned other end of the arm is moved in the direction causing the coupling of the holding member and the engaging member to be released; when the carrier top connecting member separates from the carrier bottom connecting member, the operating pin separates from the bottom of the carrier top connecting member and is permitted to couple the holding member and the engaging member.

It is preferable that the carrier bottom connecting member comprises a holding member with a U-shaped portion which accepts the engaging member of the container bottom connecting member; a lock member provided at the opening of the U-shaped portion and pivoting on the holding member so as to rotate freely to enable coupling and decoupling of the engaging member with the U-shaped portion of the holding member; and a rotating member which pivots on the holding member, rotates up and down in conjunction with the contact and separation of the carrier top connecting member, and when the rotating member is in an engaging position with the lock member, holds the coupling of the engaging member in the U-shaped portion of the holding member with the lock member.

When the carrier bottom connecting member is in the down position in the column device, and the carrier top connecting member descends and contacts the carrier bottom connecting member, the bottom of the carrier top connecting member presses against the rotating member, causing it to rotate down and causing the lock member to open the U-shaped portion. Thus, the engaging member of the container bottom connecting member easily couples with or separates from the U-shaped portion of the holding member of the carrier bottom connecting member. On the other hand, when the carrier bottom connecting member is in the down position in the column device, and the carrier top connecting member rises and separates from the bottom connecting member, the bottom of the top connecting member separates from the rotating member, stopping the rotating member in the engaging position and thereby holding the engaging member in the U-shaped portion. Therefore, when both the and bottom carrier connecting members are in contact, the engaging member of the container bottom connecting member coupled with the holding member of the carrier bottom connecting member cannot separate from the holding member. Specifically, by driving the carrier top connecting member vertically, the carrier top connecting member and the container bottom connecting member are automatically connected or released. Therefore, there is no danger Of the container dropping and being damaged when being raised or lowered.

Furthermore, if the carrier comprises a column drive mechanism which moves the column device forward and back, when the container is moved levelly on the container carrier during loading or unloading, the speed can be controlled and the container can be moved levelly by driving the column drive mechanism. It is to be noted that when a roller is provided on the bottom of the support member of the container, the container is moved levelly on the container carrier with the carrier brakes applied and the carrier stopped. However, when the bottom of the container support member is provided with a ground member, the transmission of the carrier is set in neutral, the column drive mechanism is operated to move the carrier levelly to the ground so that the container is thus moved horizontally relative to the body.

Furthermore, when the carrier comprises a carrier bottom connecting member drive means which moves the carrier bottom connecting member vertically, the container support member can be raised from the ground by operating the carrier bottom connecting member drive means after the container is loaded on the carrier.

In order to achieve the fourth object, the container carrier according to the present invention comprises column device provided to move forward and back on a subframe mounted on a chassis frame, a carrier top connecting member provided on the column device so that it moves vertically and can couple with a container top connecting member, a container loadable onto said container carrier and having a container top connecting member thereon with which said carrier top connecting member is engageable, whereby the carrier top connecting member can pull the container top connecting member and container up and down as well as pull and push the container top container member horizontally, a carrier bottom connecting member provided on the column device so that it moves vertically and, in substantial vertical alignment with said carrier top connecting member, said container having a container bottom connecting member movable up and down on the container and with which said carrier bottom connecting member is engageable, whereby the carrier bottom connecting member can pull the container bottom connecting member up and down as well as pull and push the container bottom connecting member and container horizontally; a lift chain, one end of which is fixed to the carrier top connecting member and the other end of which is connected to the column device, a lift sprocket over an upper side of which is passed the lift chain.

When the first fluid cylinder and the second fluid cylinder are driven together in one of extension and retraction directions and the container is loaded on the subframe, the carrier top connecting member coupled with the container top connecting member is raised, while when the carrier bottom connecting member is lowered and the control valve is switched in the direction which causes the first and second fluid cylinders to move in the other of the extension and retraction directions, the action of the first fluid cylinder is constrained, and the carrier top connecting member is stopped at the raised position.

The container is loaded as follows. Here, the retraction and extension of the first and second fluid cylinders respectively cause the carrier top connecting member to descend and the carrier bottom connecting member to descend. The column device is located at the back of the vehicle, and when the container top connecting member and the carrier top connecting member, and the container bottom connecting member and the carrier bottom connecting member are each connected to the other, the control valve is first operated to switch the fluid flow so that the first and second fluid cylinders simultaneously extend. This causes the front of the container to be lifted by the carrier top connecting member via the lift chain and the lift sprocket, while the back of the container is lifted by the extension of the support member so that the container is lifted while retaining a level attitude. At this time, an operation is performed whereby the column device moves forward relative to the subframe, and the container is thus moved levelly over the subframe. After this horizontal movement is completed, the control valve is operated to change the fluid flow in the direction causing the first and second fluid cylinders to simultaneously retract. Thus, the first fluid cylinder is constrained by the engagement of the carrier top connecting member with the container top connecting member and held in the extended position. On the other hand, the second fluid cylinder is not constrained and retracts, and the support member at the back of the container is stored inside the rear column.

Next, when the container is unloaded from the vehicle, an operation is executed whereby the column device is moved to the back relative to the subframe, and the support member is lowered; after that when the container is lowered, the control valve is operated for both fluid cylinders, and because the weight of the container is bearing on the first fluid cylinder, the first fluid cylinder contracts before the second fluid cylinder, and the container is lowered. Because there is only one control valve for both cylinders, it is not possible to mistakenly operate the other fluid cylinder. Therefore, tilting of the container is prevented, and the contents of the container will not fall over.

To further achieve the fourth object, the container carrier according to the present invention comprises a column device provided to move a subframe mounted on a chassis frame forward and back, a carrier top connecting member provided on the column device so that the carrier top connecting member moves vertically and can couple with a container top connecting member, a carrier bottom connecting member provided on the column device so that the carrier bottom connecting member moves vertically and can couple with a container bottom connecting member, drive means which raise and lower the carrier top connecting member and the carrier bottom connecting member; a limit switch which operates when the column device is positioned on the subframe at the back; and an operating switch which enables the operation of the drive means when the limit switch operates.

When the column device is positioned at the back of the subframe, the limit switch operates. Therefore, by operating the operating switch connected to this limit switch, the drive means can be operated. Specifically when the column device is positioned at the back of the subframe, the carrier top connecting member moves up or down, the carrier bottom connecting member remains stationary relative to the ground, and the container remains level when ascending and descending.

However, when the column device is positioned in the middle of the subframe, the limit switch does not operate. The drive means will therefore not operate even if a worker mistakenly operates the operating switch while the container is moving horizontally. The carrier top connecting member and the carrier bottom connecting member will therefore not move vertically, and the front and back of the container will be maintained at the same height. Tilting of the container is thus prevented, and the contents of the container will also not fall over.

BRIEF DESCRIPTION OF THE DRAWINGS

FIG. 18 is a schematic figure showing how FIG. 18(a) and FIG. 18 (b) fit together;

DESCRIPTION OF PREFERRED EMBODIMENTS

Figure 1:
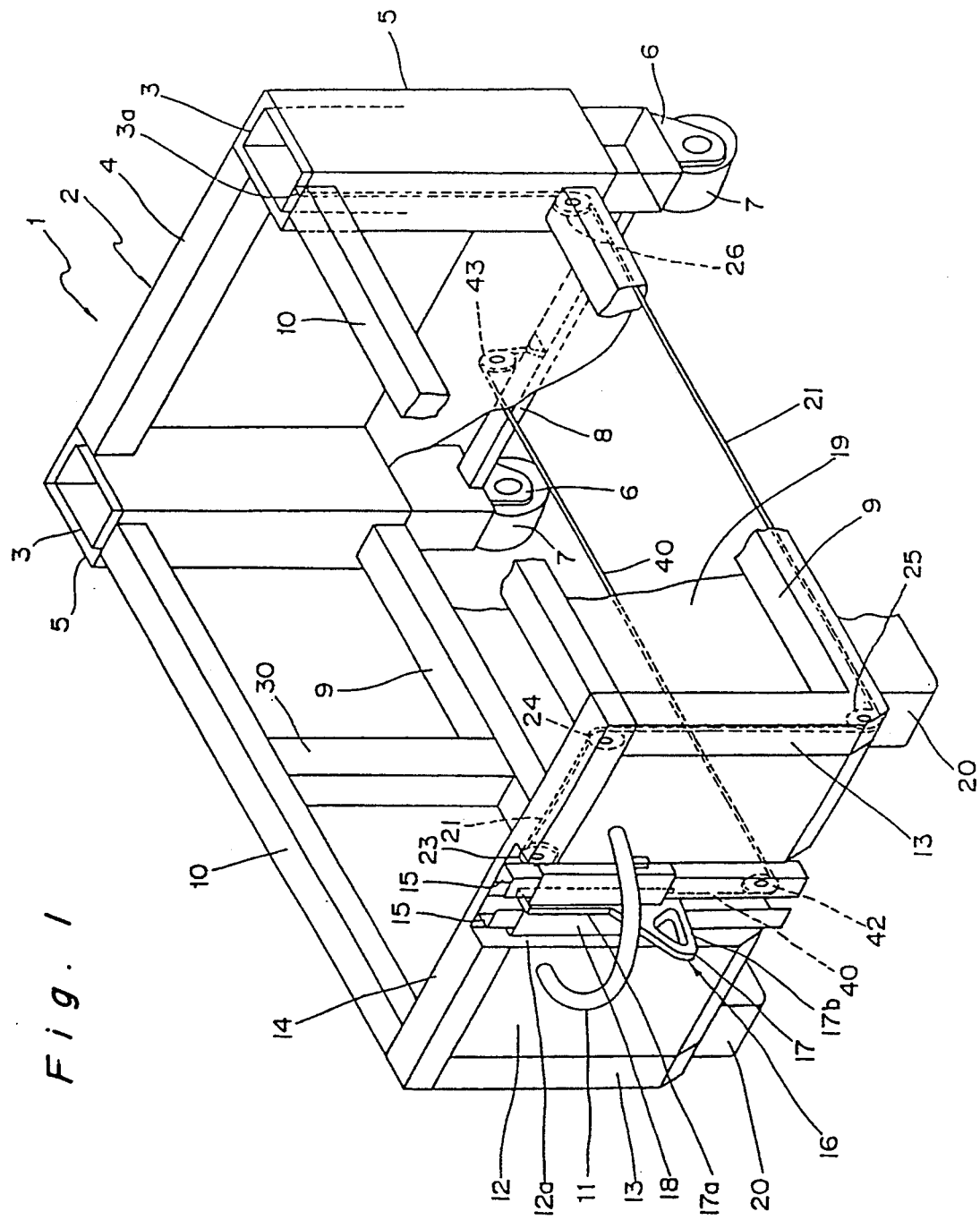
FIG. 1 and FIG. 2 are perspective views of the container and carrier, respectively, according to a first embodiment of a container carrier according to the present invention.
Figure 2:
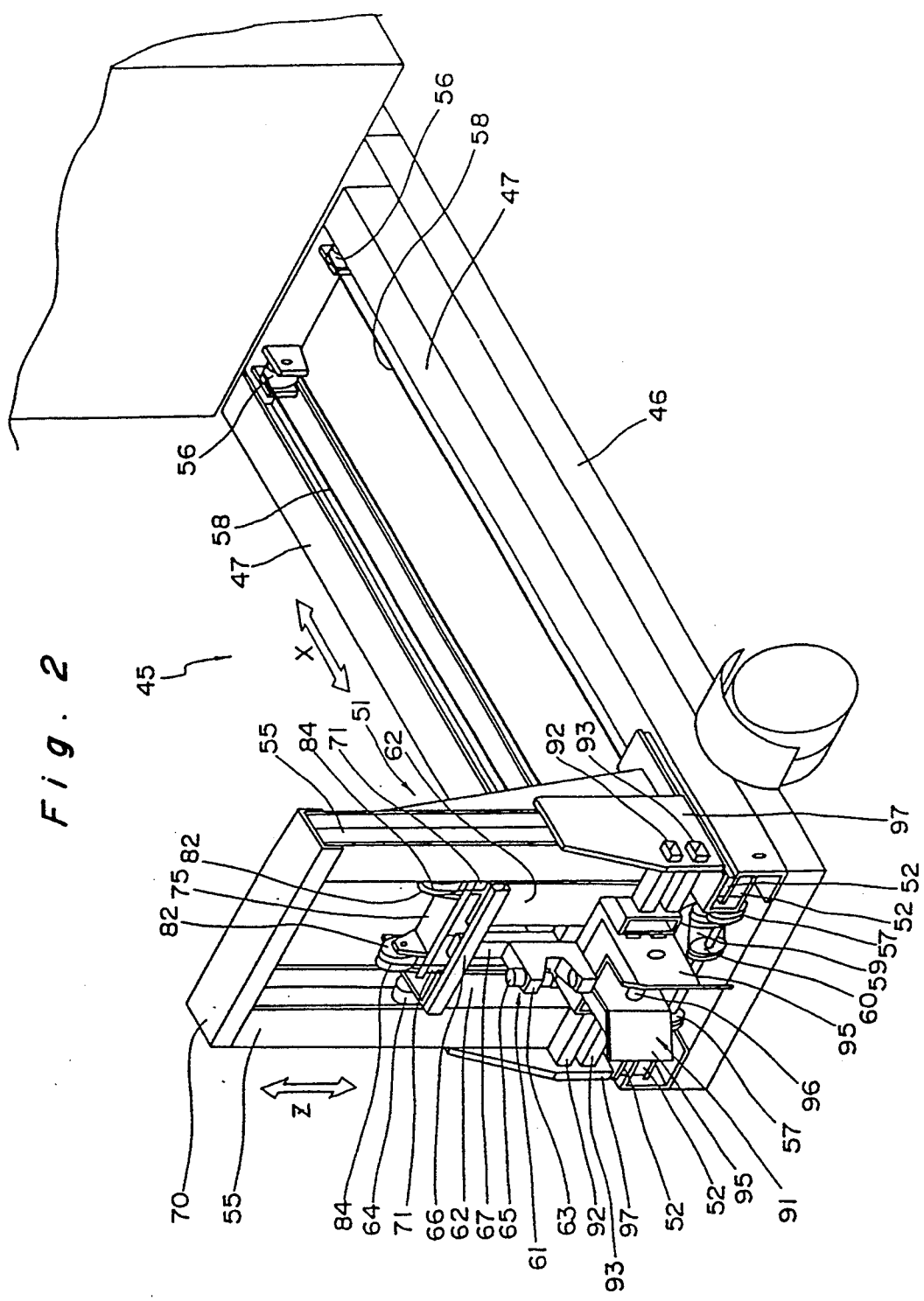

A container and container carrier according to the present invention will be described hereinbelow with reference to the accompanying figures, wherein FIG. 1 and FIG. 2 show the container 1 and carrier 45 according to a first embodiment of the present invention.

As shown in FIG. 1, the container 1 comprises a box-shaped container body 2, pillar-shaped support members 3, a top connecting member 11 on the container, a bottom connecting member 16 on the container, and chains 21, 40 as transmitting members. The container body 2 is composed of symmetrical pillar-shaped rear columns 5, front columns 13, side columns 30 (shown only on one side), rear beam 4, front beam 14, top side frames 10, bottom side frames 9, front panel 12, bottom panel 19, legs 20, and top and side panels not shown in the figure. A channel 12a with a U-shaped cross section running vertically is provided at the center of the front panel 12 and the front beam 14. The support members 3 fit inside the rear columns 5 so that they can be raised and lowered freely, and are each provided with a roller 7 mounted on the bottom end by way of a bracket 6. The bottoms of these support members 3 are connected by a single shaft 8, which causes both support members 3 to ascend and descend in unison. The top connecting member 11 of the container is a semicircular member the ends of which are attached on a horizontal line at the upper center of the front panel 12.

The container bottom connecting member 16 comprises a key-shaped engaging member 17, which has a rectangular plate 17a and a ring 17b, and a channel-shaped sliding member 18; the bottom connecting member 16 is constructed in such a way that the rectangular plate 17a and the bottom of the channel in the sliding member 18 intersect. A pair of guides 15 formed from channel steel are provided inside the channel 12a of the front beam 14 and front panel 12 with the channels facing inside and parallel to one another with a gap in between; the rectangular plate 17a of the engaging member 17 is fitted into this gap, and the outside surface of the guides 15 slides in contact with the inside surface of the channel in sliding member 18. The complete bottom connecting member 16 can thereby slide up and down.

A pair of chains 21 is provided symmetrically (shown only on one side in the figure) with one end connected to the side of the sliding member 18, the chain passing through the front beam 14 and around a pair of sprockets 23, 24 to carry the chain first horizontally from the sliding member and then down vertically from the horizontal, through the front column 13, around the sprocket 25 at the bottom of the front column 13 so that the chain is carried from the vertical horizontally to the back through the bottom side frame 9, around the sprocket 26 at the back end of the bottom side frame 9 from the lengthwise horizontal to the vertical, and the other end is connected to the top 3a of the support member 3. The other chain 40 likewise has one end connected to the bottom of the engaging member 17, is passed vertically at the front of the container body 2, guided from the vertical to the horizontal lengthwise of the container by the sprocket 42 provided at the front bottom of the container body 2, under the bottom panel 19, guided vertically by the sprocket 43 provided at the back bottom of the container body 2, and the other end is connected to the shaft 8.

Therefore, by pushing the container bottom connecting member 16 down from the position shown in the figure, the support members 3 are extended down via the chain 21, and the other chain 40 is loosened, allowing the shaft 8 to descend, i.e., allowing the support members 3 to descend. Conversely, when the bottom connecting member 16 of the container is move up from the down position, the support members 3 are lifted by the chain 40 via the shaft 8, and the other chain 21 is loosened to allow the support members to rise.

FIG. 2 shows the carrier 45. This carrier 45 is provided with channelled subframes 47 parallel to each other and with the channels facing the inside on the chassis frame 46. The column device 51 is provided on the subframes 47 so that it can move freely back and forth in the direction indicated by arrow X. This column device 51 is such that it can slide along the top of the subframes 47 on its slide pads 52 which sandwich the top rails of the subframes 47. The column device 51 also comprises a pair of columns 55 made of H-channel steel; the tops of the columns 55 are connected by horizontal plate 70, and the bottoms are connected by a bottom plate not shown in the figure. This bottom plate is connected to the pair of chains 58 which extend around the two pairs of sprockets 56, 57 provided at the front and back of the chassis. A sprocket 60 is provided on the shaft connecting the rear sprockets 57, and is driven by a hydraulic motor 59. Therefore, this hydraulic motor 59 moves the column device 51 forward and back in the direction of arrow X by driving the chains 58.

Figure 3A:
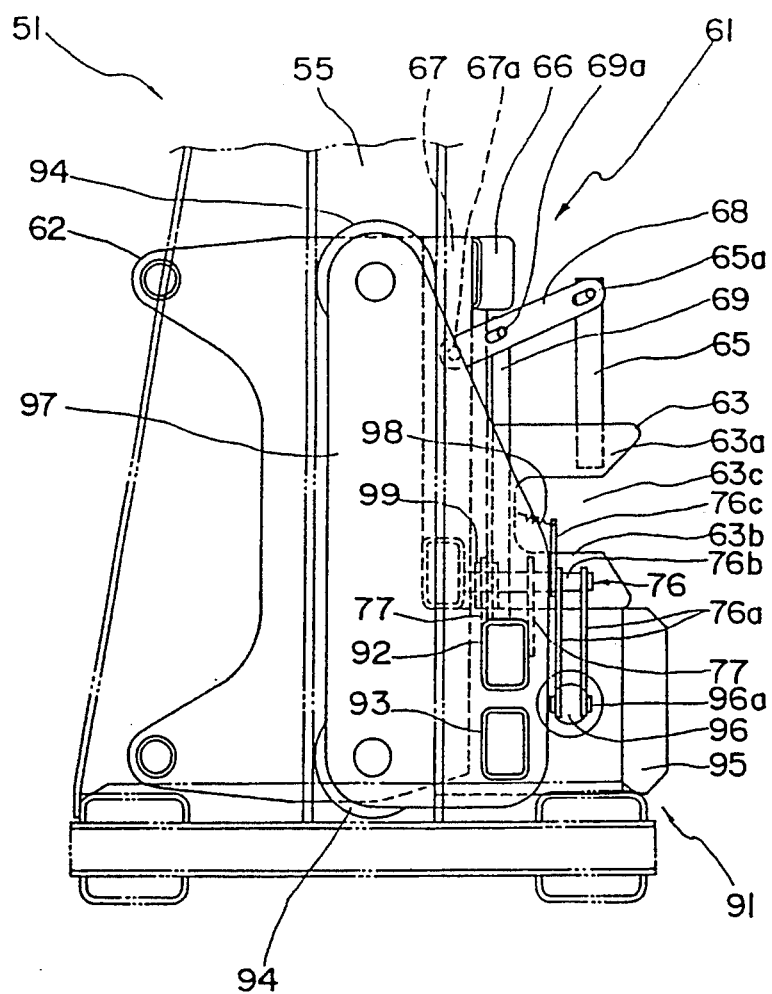
FIGS. 3(a) and (b) are side and rear views, respectively of the column device on the carrier.

In addition, a carrier top connecting member 61 and a carrier bottom connecting member 91 are also provided at the back of the columns 55 in such a way hat they can move freely up and down, respectively, as indicated by arrow Z. As shown in FIGS. 3(a) and (b), the carrier top connecting member 61 comprises a pair of plates 62 with an L-shaped cross section connected by a horizontal rod 66, a holding member 63 mounted on the vertical rod 67, a coupling pin 65 which passes through and connects both sides of the holding member 63, a pair of right and left arms 68 and operating pins 69, and pressure plate 100 mounted on the plates 62. The holding member 63 is provided horizontally with the U-shaped portion 63c formed by the top part 63a and the bottom part 63b facing the back. Studs 67a, 65a, and 69a are provided horizontally, respectively, at the top of the vertical rod 67, coupling pin 65, and operating pins 69. A round hole is provided in one end and oval holes are provided at the other end and at approximately the center of the arms 68; the arms 68 are mounted with one end rotating freely on the studs 67a, and the oval holes at the other end and the approximate center rotating freely and with play in the long direction on the studs 65a and 69a.

When the operating pins 69 are not forced up by the rod 92 at the carrier bottom connecting member 91 as will be described hereinbelow, the weight of the coupling pin 65 causes the arms 68 to rotate down pivoting on the studs 67a, thus connecting the part 63a, 63b of the holding member 63, and when the operating pins 69 are driven up by the rod 92, the lever action lifts the coupling pin 65 up from the holding member 63.

The carrier top connecting member 61 is constructed such that it can travel vertically between the right and left columns 55 along the inside of the channel in the columns 55 guided by the rollers 64 and 64a, mounted at the side of the plates 62.

The carrier bottom connecting member 91 comprises a pair of side plates 97 covering the sides of the columns 55; a pair of rods 92, 93 top and bottom connecting the side plates 97 horizontally; holding member 95 at the center of the rods 92, 93; a connecting pin 96 which can connect both sides of the holding member 95; a stud 76b which rotates freely in brackets 77 provided at the top of the rod 92; a bell crank 76 composed of arm 76a, arm 76c and arm 76d which are formed as a single assembly with the stud 76b; coil spring 98 as a reflexive member; and rollers 99 at the end of the third arm 76d. It is to be noted that the bell crank 76, coil spring 98, and rollers 99 form an operating mechanism, and that the rollers 99 can contact the pressure plate 100 of the carrier top connecting member 61.

Figure 3B:
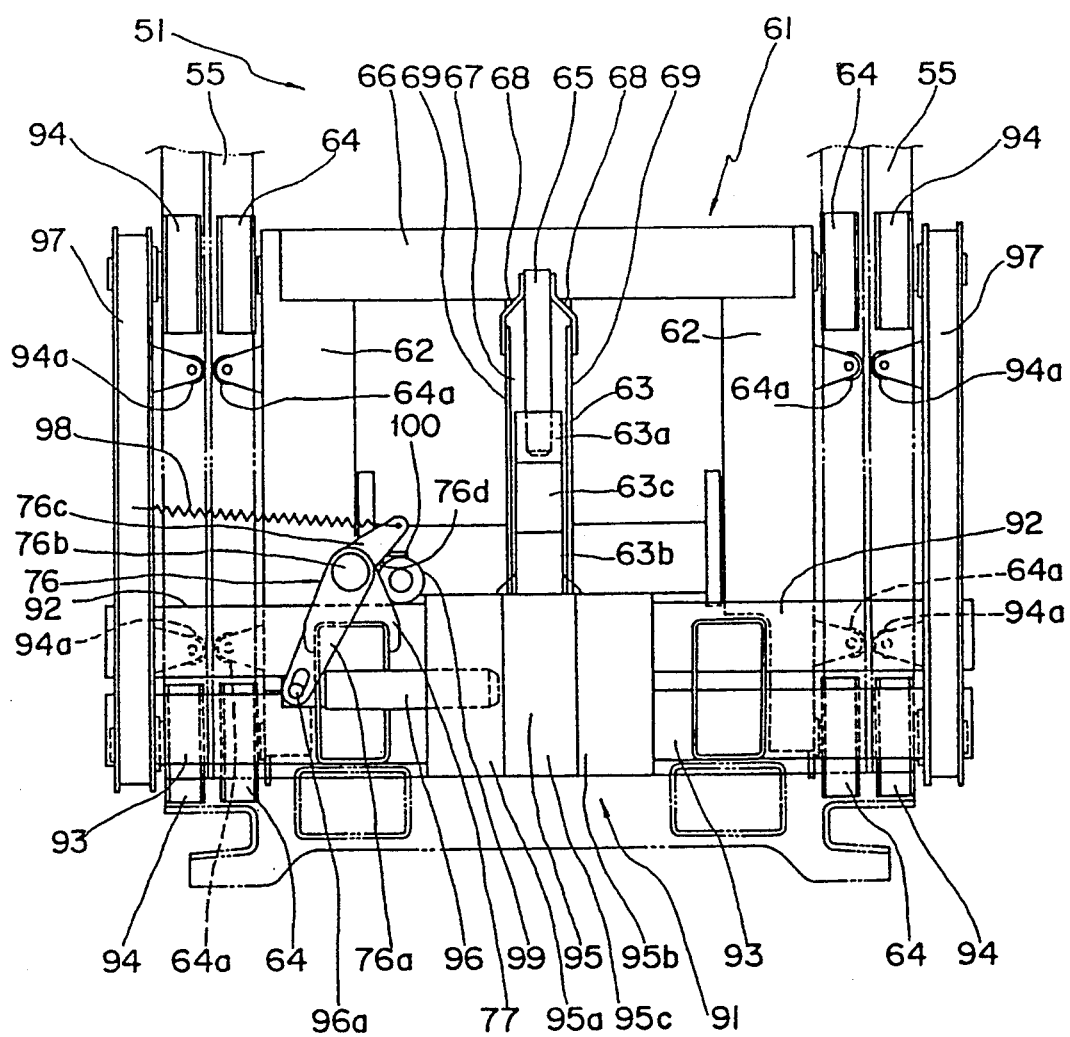

The holding member 95 is provided with the U-shaped portion 95c formed by left part 95a and the right part 95b horizontal and facing the back. The bell crank 76 is mounted with the first arm 76a and the second arm 76c facing in opposite directions around the stud 76b, and the third arm 76d approximately perpendicular to the arms 76a and 76c. A stud 96a is provided horizontally at one end of the connecting pin 96, an oval hole is provided in the end of the first arm 76a, and the end of the first arm 76a is mounted so as to rotate freely on the stud 96a. The end of the second arm 76c and the side plates 97 are connected by the coil spring 98, forcing the bell crank 76 to rotate to the left around the stud 76b in FIG. 3(b). An action force is thus constantly applied causing the connecting pin 96 to pass through and connect both sides of the holding member 95. When the rollers 99 are not pushed down by the pressure plate 100 of the carrier top connecting member 61, the connecting pin 96 is caused to move to the right by this force, thus connecting the side parts 95a, 95b of the holding member 95; when the rollers 99 are pushed down by the pressure plate 100, the action of the bell crank 76 causes the connecting pin 96 to move to the left away from the holding member 95, thereby releasing the connection. The carrier bottom connecting member 91 is able to travel up and down along the outside channel in the right and left columns 55 on the rollers 94, 94a provided inside the side plates 97. When the carrier top connecting member 61 and the carrier bottom connecting member 91 approach each other vertically, the pressure plate 100 of the carrier top connecting member 61 pushes the rollers 99 of the carrier bottom connecting member 91 down, and the rod 92 of the carrier bottom connecting member 91 presses the operating pins 69 of the carrier top connecting member 61; when the carrier top connecting member 61 and the carrier bottom connecting member 91 separate vertically, the pressure plate 100 and rollers 99, rod 92 and operating pins 69 each separate.

Figure 4A:
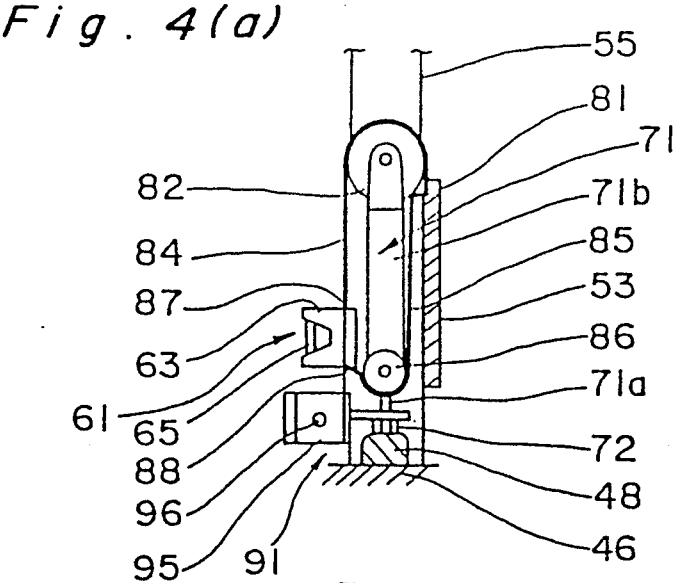
FIGS. 4(a) (b), and (c) are figures showing the operation of the column device.

As shown in FIG. 4(a), a right and left pair of hydraulic cylinders 71 are mounted inside the pair of columns 55 with the piston rods 71a pointing down, with the top sprockets 82 mounted on the top ends of the tubes 71b of the hydraulic cylinders 71, and the bottom sprockets 86 mounted on the bottom end of the tubes 71b. One end of the top chain 84 is connected to the top 87 of the plates 62, the top chain 84 is passed over the top sprocket 82 so that it descends vertically, and the other end is fixed to the mounting point 81 of the bridge 53 connecting the pair of columns 55 horizontally. In addition, the bottom chain 85, one end of which is fixed to the bottom 88 of the plates 62, is passed around the bottom sprocket 86 and the other end is fixed to the mounting point 81 of the bridge 53.

Figure 4B:
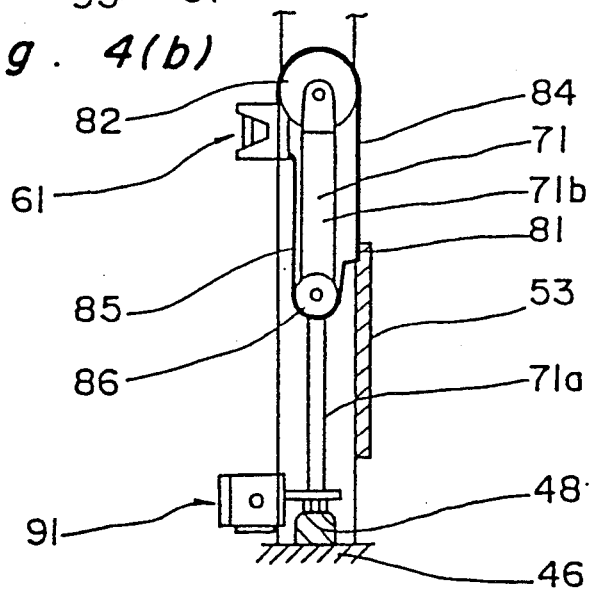
Figure 4C:
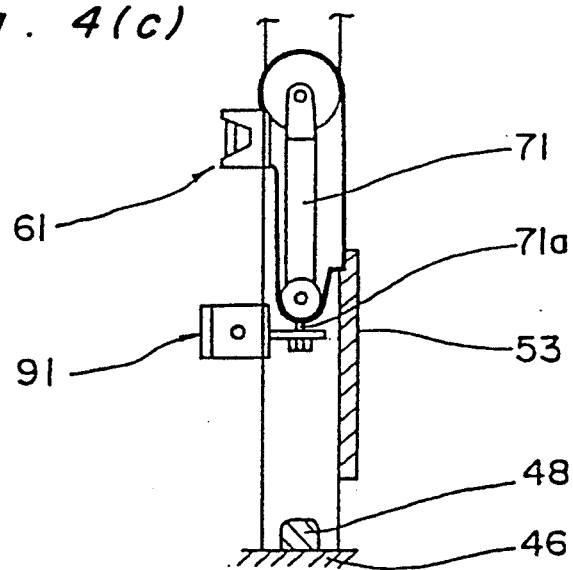

Thus, it is possible to extend the piston rods 71a of the hydraulic cylinders 71 so that the ends of the piston rods 71a contact the rubber seat 48 of the chassis frame 46 of the carrier 45, the tubes 71b move up, and the carrier top connecting member 61 are lifted up by the top chain 84 as shown in FIG. 4(b). In addition, by retracting the piston rods 71a, the tubes 71b and the carrier top connecting member 61 will descend of their own weight. As shown in FIG. 4(c), the carrier bottom connecting member 91 is connected to the piston rods 71a of the hydraulic cylinders 71 by a nut 72, thus causing the bottom connecting member 91 to be driven up and down according to the action of the piston rods 71a. When thus assembled, the carrier top connecting member 61 and the carrier bottom connecting member 91 are vertically proximal only when they are both at the lowest position (hereinafter the down position) in the columns 55, and when either one is at any position other than the down position, they are separated from each other according to the length of the tubes 71b and the piston rods 71a. Thus, when the carrier top connecting member 61 and the carrier bottom connecting member 91 are in the down position in the column device 51, the couplings of the holding member 63 and the holding member 95 are released by the action of the pressure plate 100 and rollers 99, and the action of rod 92 and the operating pins 69. However, when the carrier top connecting member 61 and the carrier bottom connecting member 91 are in any position other than the down position, the holding member 63 and the holding member 95 are each closed by the coupling pin 65 and the connecting pin 96, respectively.

The container 1 and carrier 45 as described above operate as follows.

Figure 5A:
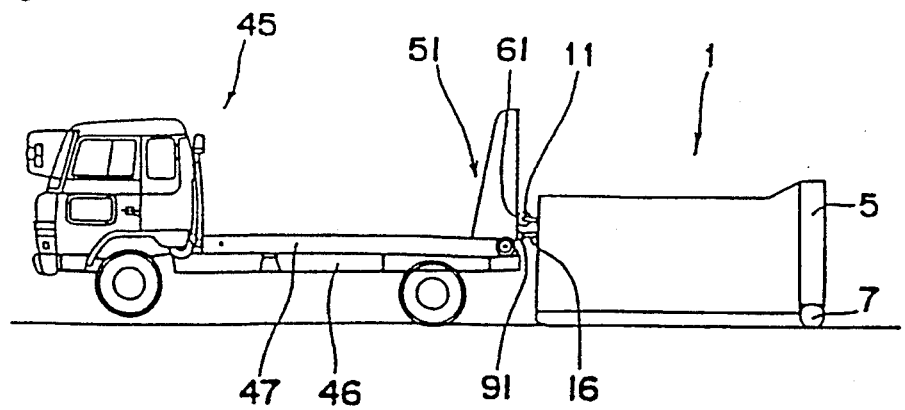
FIGS. 5(a) to (d) are figures showing the operation of the container carrier.
Figure 5B:
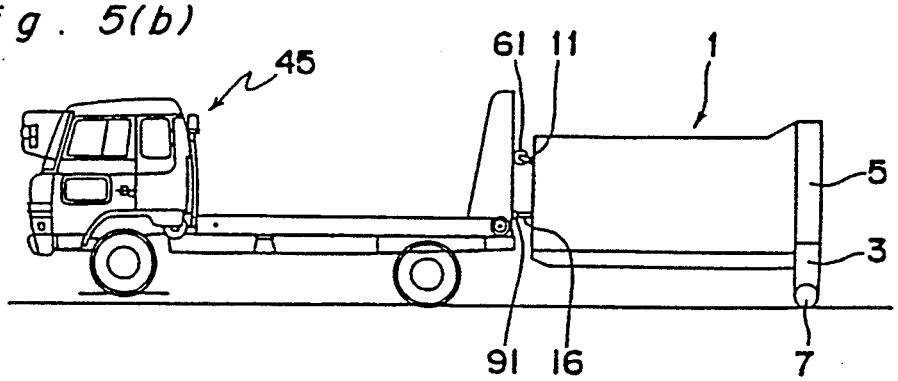

The carrier 45 and the container 1 are positioned as shown in FIG. 5(a) at the start of the loading operation with the container bottom connecting member 16 in the up position and the support members 3 retracted inside the rear columns 5. In addition, the carrier top connecting member 61 and the carrier bottom connecting member 91 are both in the down position in the column device 51, and the holding members 63, 95 are therefore released. At this position, the U-shaped portion 63c of the holding member 63 of the carrier member 61 couples with the top connecting member 11, and the ring 17b of the engaging member 17 on the container bottom connecting member 16 couples with the U-shaped portion 95c of the holding member 95 in the carrier bottom connecting member 91. When the hydraulic cylinders 71 are extended as shown in FIG. 4(b), the ends of the piston rods 71a are supported by the seat 48, the tubes 71b rise, and the top sprocket 82 rises. Because the one end of the top chain 84 is fixed to the bridge 53, the lifting of the top sprocket 82 causes the carrier top connecting member 61 mounted on the other end to rise. The carrier bottom connecting member 91, however, remains at the down position in the columns 55. As the carrier top connecting member 61 and the carrier bottom connecting member 91 separate, the holding member 63 and holding member 95 are both automatically closed by the coupling pins 65, 96, respectively, and the carrier top connecting member 61 and the container top connecting member 11, and the carrier bottom connecting member 91 and the container bottom connecting member 16 are thus automatically coupled together. As shown in FIG. 5(b), the front of the container 1 is lifted via the container top connecting member 11 by the carrier top connecting member 61, and at the same time the back of the container 1 is lifted by the support members 3 as described below.

Specifically, because the container bottom connecting member 16 is held stationary with respect to the ground by the stationary carrier bottom connecting member 91, when the container body 2 rises, the container bottom connecting member 16 descends relative to the container body 2. This action drives the chain 21 and the chain 40, causing the support members 3 to extend down, thus lifting the back of the container 1. In other words, the front of the container 1 is lifted by the container top connecting member 11, and the back is lifted by the support members 3, and this action is synchronized, and the container 1 thus remains level as it is raised as shown in FIG. 5(b).

Figure 5C:
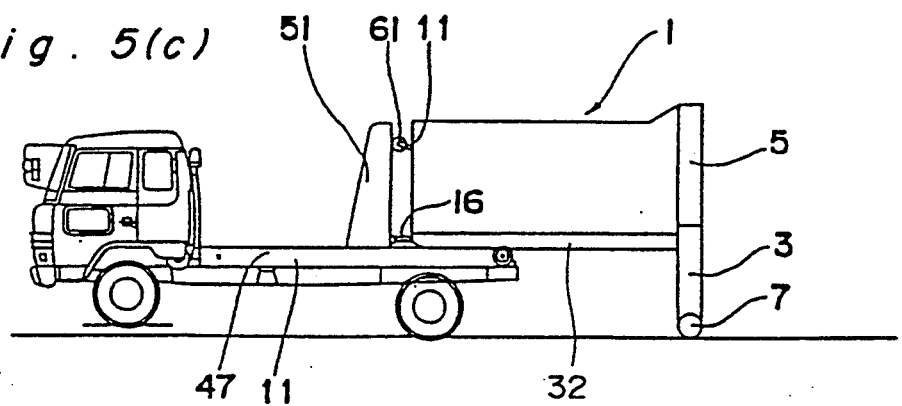

When the main beam 32 at the bottom of the container body 2 reaches the same height as the carrier 45 subframe 47, the hydraulic cylinders 71 on the carrier stop operating. The column device 51 at this time is as shown in FIG. 4(b). The container 1 lifting action is stopped, the hydraulic motor 59 is driven, the column device 51 is moved forward, and the container 1 thus moves forward as shown in FIG. 5(c). At this time, the back of the container 1 is supported on the ground by the rollers 7 at the bottoms of the support members 3, and the front of the container 1 is pulled by the carrier top connecting member 61 and the carrier bottom connecting member 91 coupled with the container top connecting member 11 and the container bottom connecting member 16, respectively.

Figure 5D:
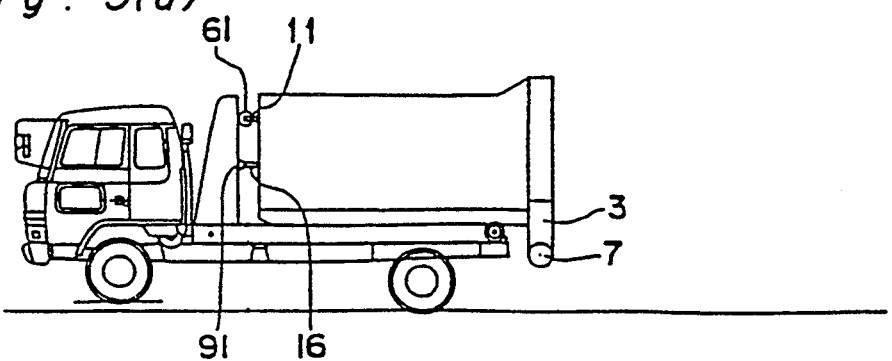
Figure 6:
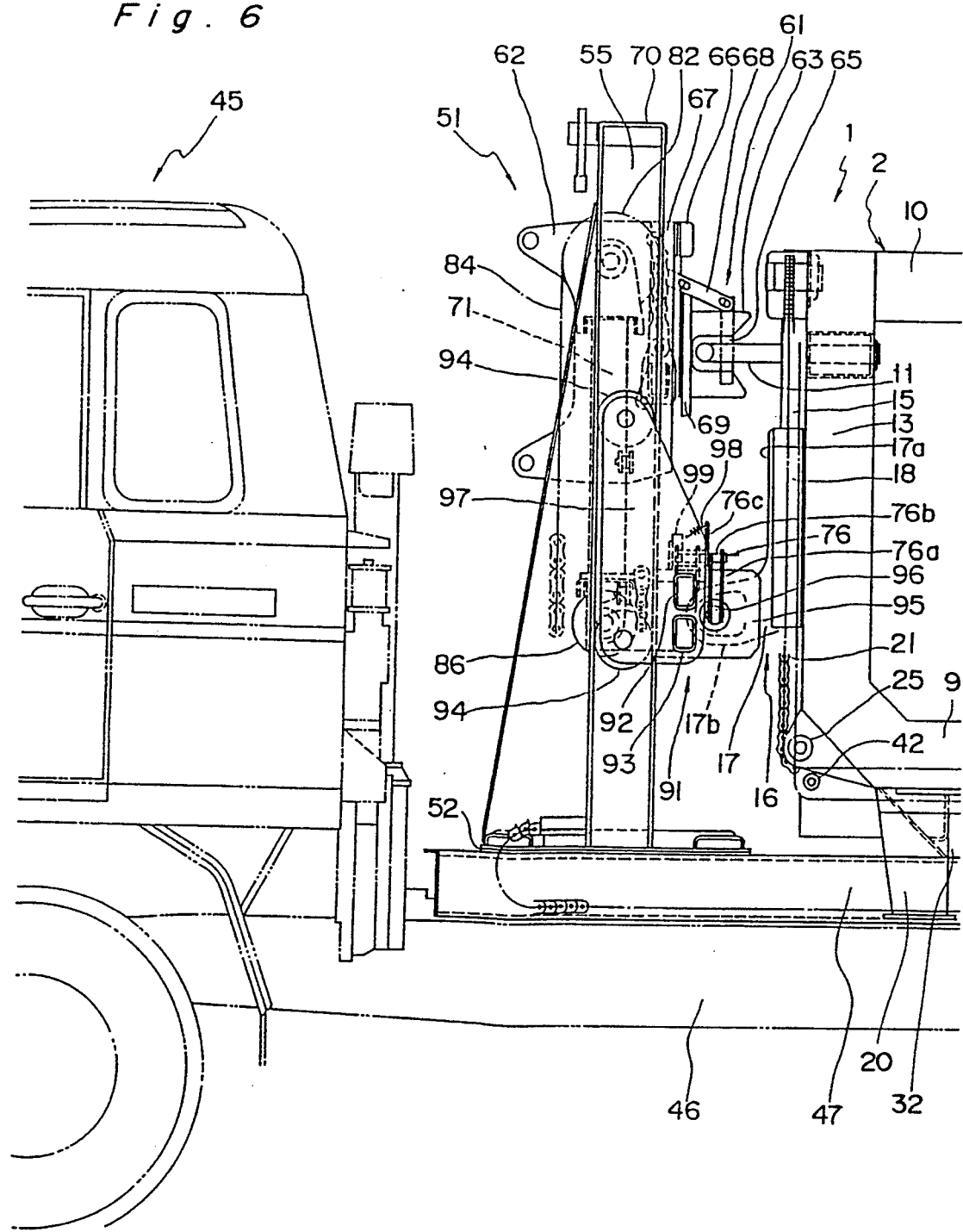
FIG. 6 is a side elevation view showing the container carrier when container loading is completed.

After horizontal movement of the container 1 is completed, the hydraulic cylinders 71 are retracted with the container 1 mounted on the carrier 45 as shown in FIG. 6. At this time, the carrier top connecting member 61 is held at the height of the container top connecting member 11 because it is connected thereto. As a result, the hydraulic tubes 71b are constrained vertically by the bottom chain 85 and the top chain 84, and are held at the same height. Therefore, as shown in FIG. 4(c), the ends of the piston rods 71a separate from the seat 48 of the chassis frame 46 and rise, and the carrier bottom connecting member 91 connected to the end of the piston rods 71a is thereby lifted. Then, as shown in FIG. 5(d), the container bottom connecting member 16 connected to the carrier bottom connecting member 91 is lifted, and the support members 3 are raised from the ground via the chain 21 and the chain 40.

When the container 1 is unloaded from the carrier 45, this procedure is simply reversed.

As thus described, a container carrier according to the first embodiment of the present invention can load and unload a container 1 on the carrier 45 while holding the container 1 in a level position. Moreover, the carrier top connecting member 61 and container top connecting member 11, and the carrier bottom connecting member 91 and the container bottom connecting member 16 are automatically coupled and released with the loading and unloading action, and it is thereby possible to prevent any damage caused by the container dropping during loading and unloading.

Furthermore, because this container 1 has the chain 21 used as the transmitting means passing through the bottom side frames 9 of the container body 2, and the support members 3 are fitted inside the rear columns 5, when the outside dimensions of the container body 2 are restricted, the frame size can be increased to the maximum allowable, and the cargo volume can be maximized. Moreover, because the chain 21 is protected by the bottom side frames 9, which are structural members of the container body 2, separate members to protect the chain are not necessary.

Furthermore, it is also possible to load the container on the carrier by simply backing the carrier up under the container instead of providing a means for moving the column device 51 on the carrier 45.

Figure 7:
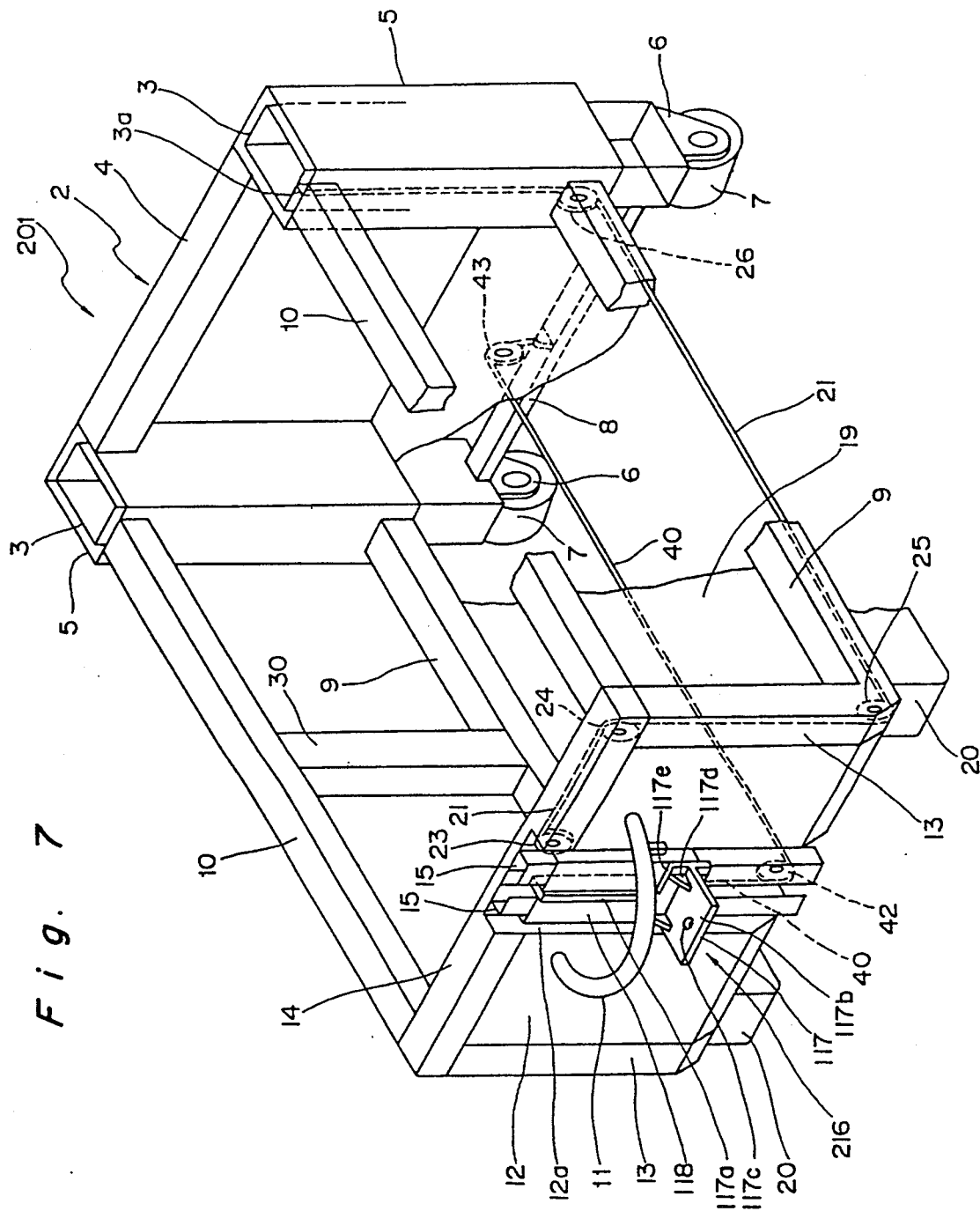
FIG. 7 and FIG. 8 are perspective views of the container and carrier, respectively, according to a second embodiment of a container carrier according to the present invention.
Figure 8:
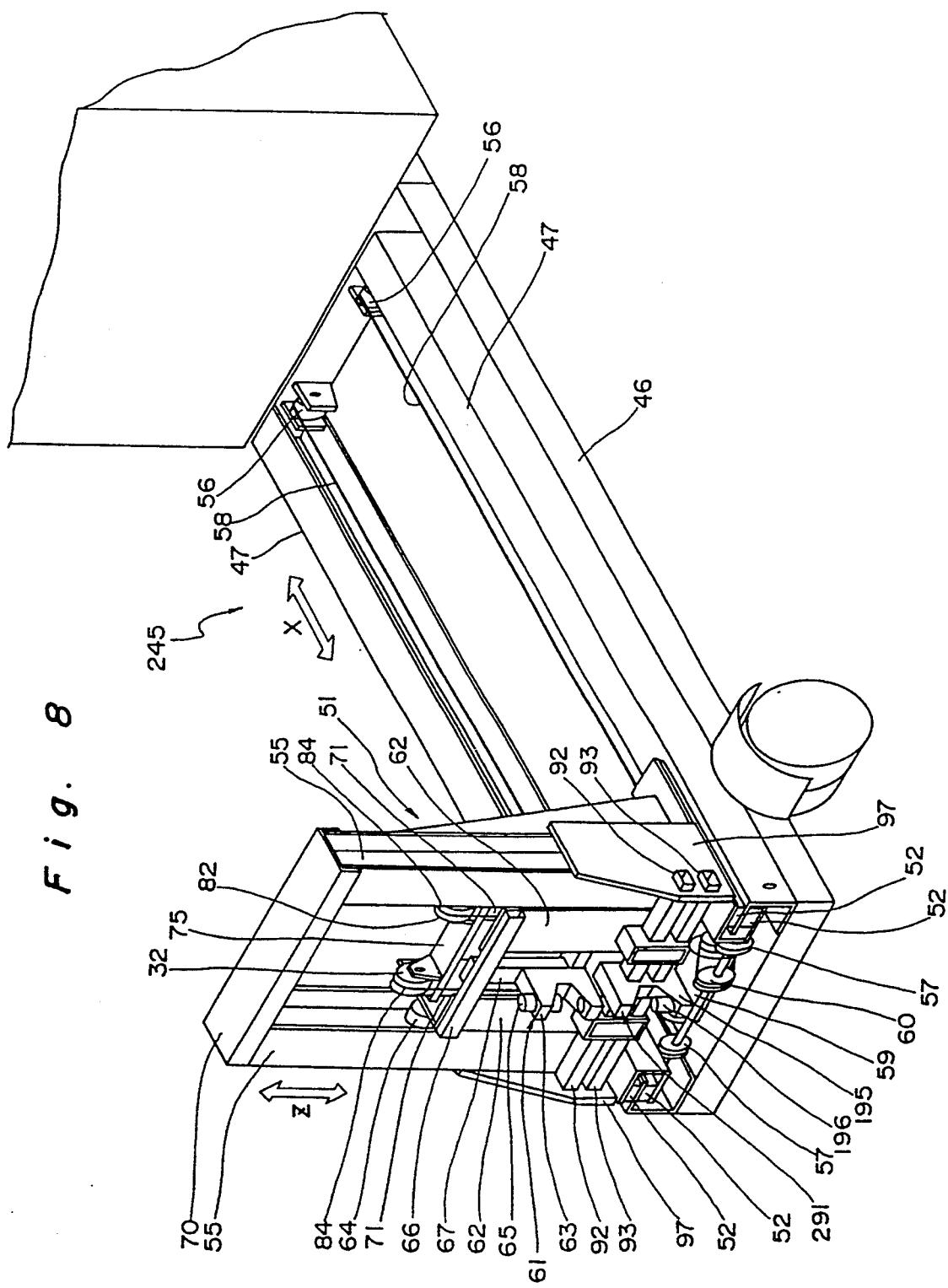

A second embodiment of the container 201 and the carrier 245 are shown in FIG. 7 and FIG. 8 wherein those parts which are the same as in the first embodiment are designated by like numbers. As shown in FIG. 7, the container 201 has a container bottom connecting member 216. The container bottom connecting member 216 comprises an engaging member 117 and a sliding member 118.

The engaging member 117 is composed of a rectangular plate 117e perpendicular to the horizontal rectangular plate 117b with reinforcing ribs 117d extending therebetween, and a vertical rectangular plate 117a perpendicular to the rectangular plate 117e. A round hole 117c is provided in the rectangular plate 117b so that a connecting pin 196 can pass therethrough.

Said container bottom connecting member 216 is constructed in such a way that the rectangular plate 117a and the bottom of the channel in the sliding member 118 intersect. A pair of guides 15 formed from channel steel are provided inside the channel 12a of the front beam 14 and front panel 12 with the channels of the guides facing inside and parallel to one another with a gap therebetween; the rectangular plate 117a of the engaging member 117 is fitted into this gap, and the inside surface of the channel in sliding member 118 slides in contact with the outside surface of the guides 15.

Therefore, as with the first embodiment described hereinabove, by pushing the container bottom connecting member 216 down from the position shown in FIG. 6, the support members 3 are extended down via the chain 21, and the other chain 40 is loosened, allowing the shaft 8 to descend, i.e., allowing the support members 3 to descend. Conversely, when the bottom connecting member 116 of the container is moved up from the down position, the support members 3 are lifted by the chain 40 via the shaft 8, and the other chain 21 is loosened to allow the support members to rise.

Figure 9A:
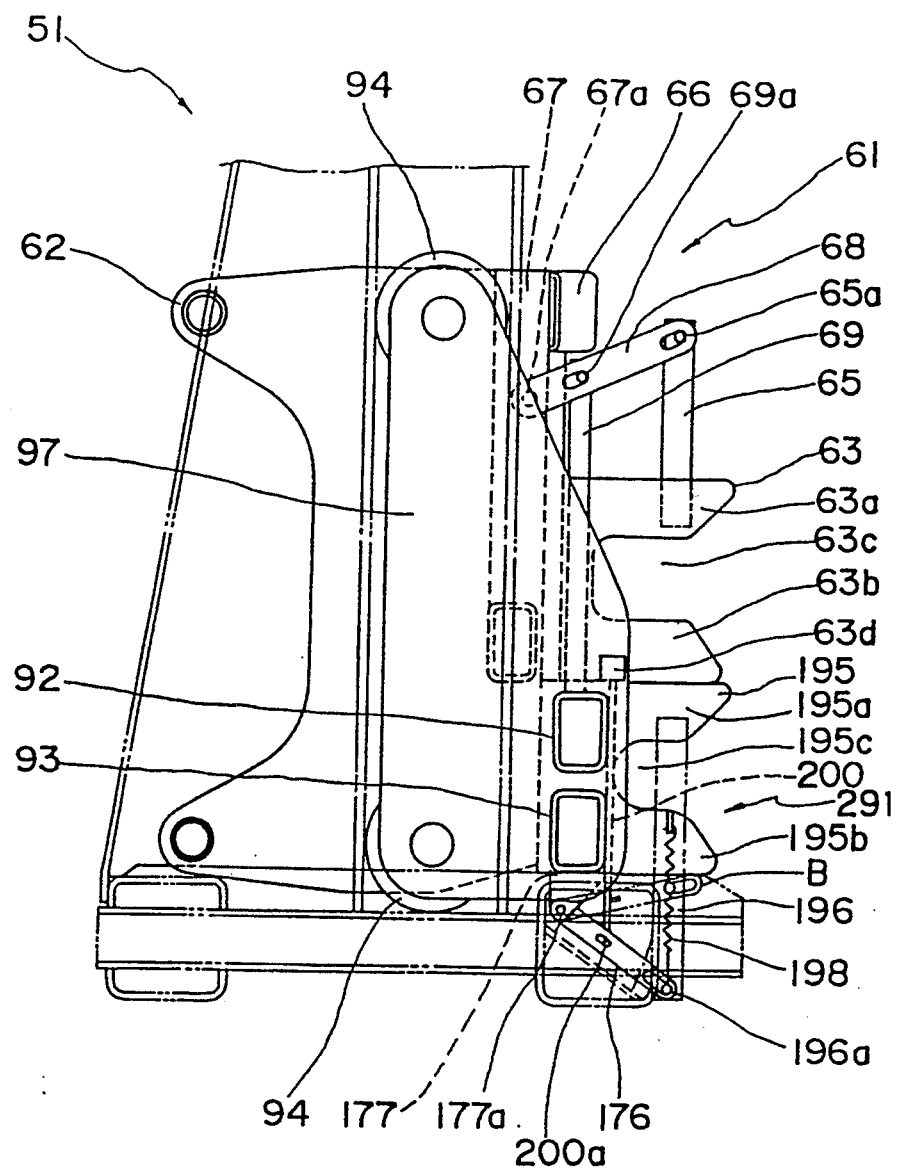
FIGS. 9(a) and (b) are side and rear views, respectively, of the column device on the carrier.
Figure 9B:
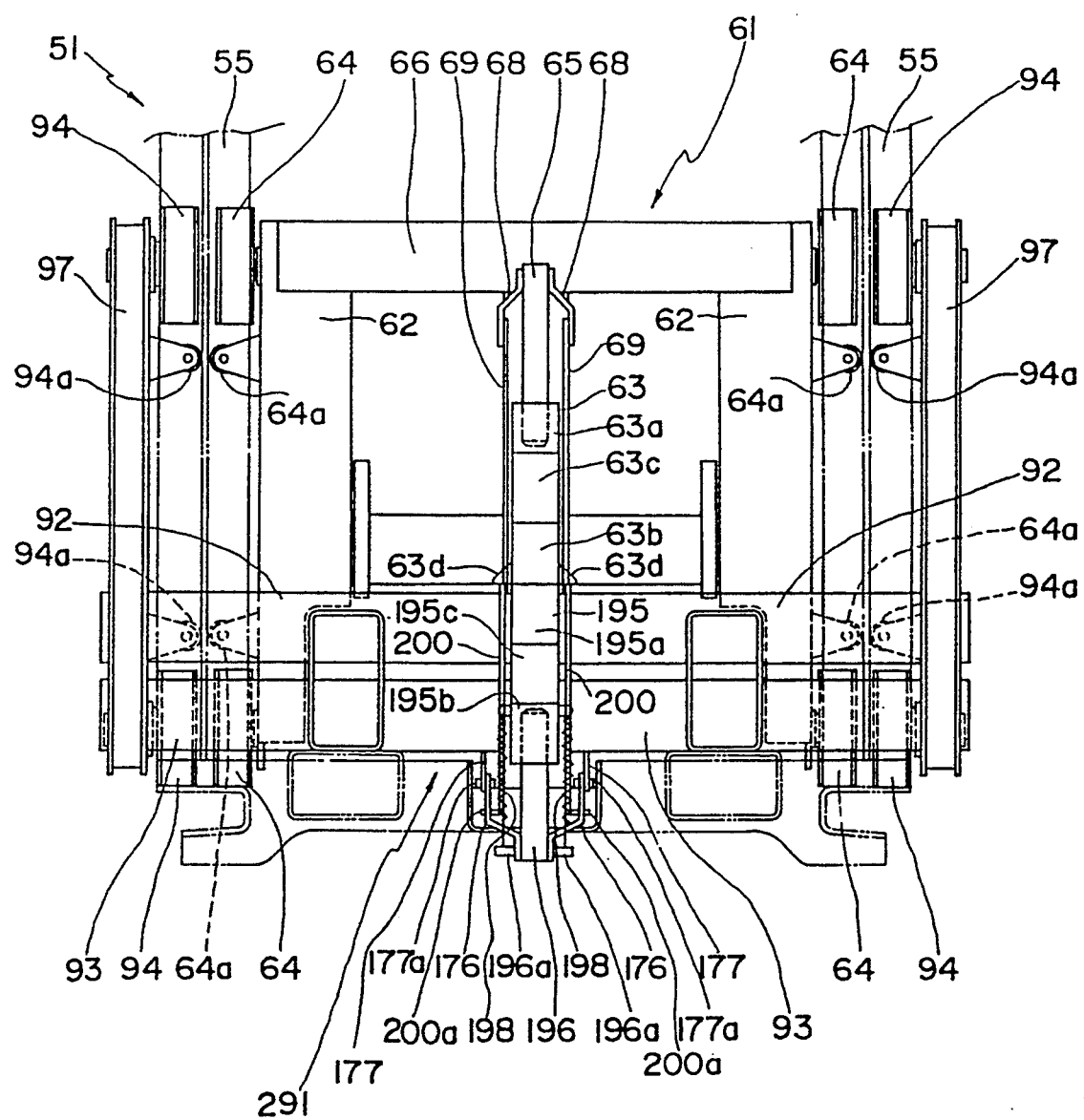

FIG. 8 shows the carrier 245. This carrier 245 comprises a column device 51 as in the first embodiment described hereinabove, with the carrier top connecting member 61 and the carrier bottom connecting member 291 each provided so as to move freely up and down in the direction indicated by the arrow Z behind the columns 55. As shown in FIG. 9(a) and (b), the carrier top connecting member 61 is constructed identically to that shown in the first embodiment. Note that the holding member 63 has projecting members 63d which can contact the operating pin 200 of the carrier bottom connecting member 291 as will be described hereinbelow. The carrier bottom connecting member 291 comprises a pair of side plates 97 covering the sides of the columns 55; a pair of rods 92, 93 top and bottom connecting the side plates 97 extending horizontally; holding member 195 at the center of the rods 92, 93; a connecting pin 196 which can connect both sides of the holding member 195; a pair of left and right brackets 177 at the bottom of the rod 93; arms 176; operating pins 200 which can contact the projecting members 63d of the holding member 63; and coil springs 198 as the tension members. It is to be noted that the arms 176, operating pins 200, and coil springs 198 form the operating mechanism.

The holding member 195 is provided with the U-shaped portion 195c formed by top part 195a and bottom part 195b which are facing the back. The brackets 177, connecting pin 196, and operating pins 200 are each provided on the bottom end with horizontal studs 177a, 196a, and 200a, respectively; a round hole is provided in one end and oval holes are provided at the other end and at approximately the center of the arms 176. One end of the arms 176 is mounted so as to rotate freely on the studs 177a, and the oval holes at the other end and the approximate center rotating freely and with play in the long direction on the studs 196a, and 200a. The studs 196a and the bottom part 195b of the holding member 195 are connected by the coil springs 198, which constantly apply a force driving the connecting pin 196 in the direction through both sides of the holding member 195 (in FIG. 9(a), the arms 176 rotating to the left on the studs 177a). When the operating pins 200 are not pressed downward by the projecting parts 63d of the holding member 63, the connecting pin 196 is driven up by the force of the coil springs 198, thereby connecting the top and bottom parts 195a, 195b on both sides of the holding member 195 and coupling with the container connecting member 216; when the operating pins 200 are not forced downward by the projecting parts 63d, a lever action drives the holding member 195 down to open and release the coupling.

This carrier bottom connecting member 291 is constructed such that it can travel vertically along the outside channel in the right and left columns 55 on the rollers 94, 94a provided inside the side plates 97. Thus, when the carrier top connecting member 61 and the carrier bottom connecting member 291 approach each other vertically, the projecting parts 63d of the holding member 63 in the carrier top connecting member 61 pushes the operating pins 200 of the carrier bottom connecting member 291 downward, and the rod 92 of the carrier bottom connecting member 291 pushes on the operating pins 69 of the carrier top connecting member 61; when the carrier top connecting member 61 and the carrier bottom connecting member 291 separate vertically, the projecting parts 63d and the operating pins 200, and the rod 92 and the operating pins 69 each separate respectively.

Figure 10A:
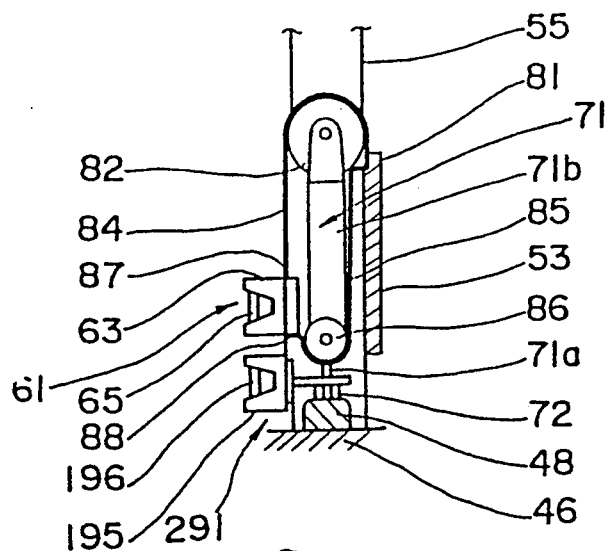
FIGS. 10(a), (b), and (c) are figures showing the operation of the column device.

As shown in FIG. 10(a), a pair of right and left hydraulic cylinders 71 is mounted inside the pair of columns 55 with the piston rods 71a pointing down, the top sprockets 82 mounted on the top ends of the tubes 71b of the hydraulic cylinders 71, and the bottom sprockets 86 mounted on the bottom ends of the tubes 71b. One end of the top chain 84 is connected to the top 87 of the plates 62, the top chain 84 is passed over the top sprocket 82 so that it descends vertically, and the other end is fixed to the mounting point 81 of the bridge 53 connecting the pair of columns 55 horizontally. In addition, the bottom chain 85, one end of which is fixed to the bottom 88 of the plates 62, is passed around the bottom sprocket 86 and the other end is fixed to the mounting point 81 of the bridge 53.

Figure 10B:
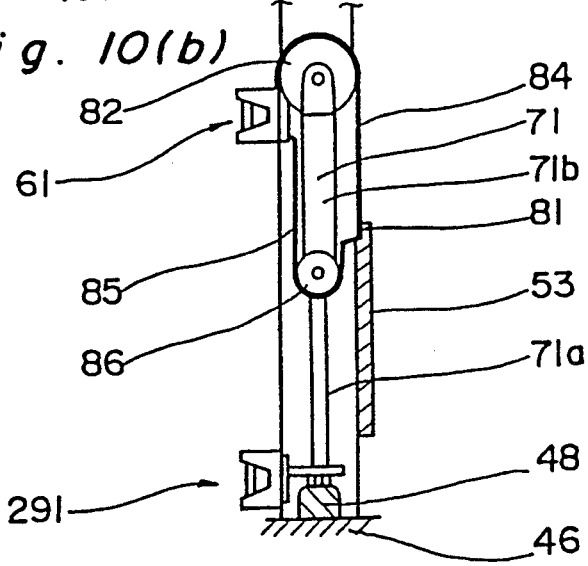
Figure 10C:
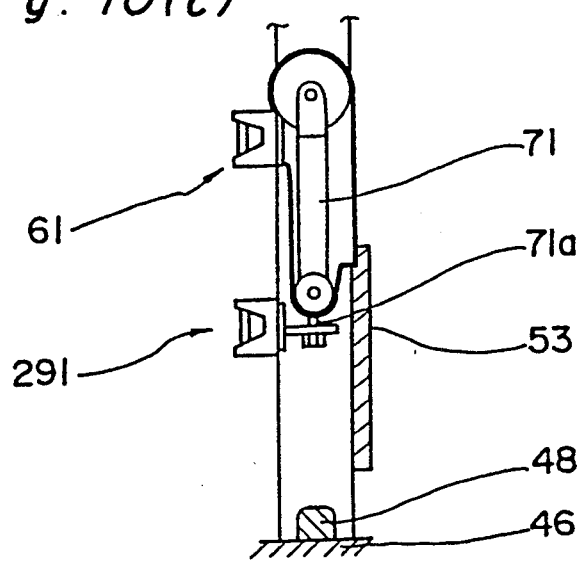

Thus, it is possible to extend the piston rods 71a of the hydraulic cylinders 71 so that the ends of the piston rods 71a contact the rubber seat 48 of the carrier 45 chassis frame 46, the tubes 71b move up, and the carrier top connecting member 61 is lifted up by the top chain 84 as shown in FIG. 10(b). In addition, by retracting the piston rods 71a, the tubes 71b and the carrier top connecting member 61 will descend of their own weight. As shown in FIG. 10(c), the carrier bottom connecting member 291 is connected to the piston rods 71a of the hydraulic cylinders 71 by a nut 72, thus causing the bottom connecting member 291 to be driven up and down according to the action of the piston rods 71a. When thus assembled, the carrier top connecting member 61 and the carrier bottom connecting member 291 are vertically proximal only when they are both at the lowest position (hereinafter the down position) in the columns 55, and when in any position other than the down position, they are separated from each other according to the length of the tubes 71b and the piston rods 71a. Thus, when the carrier top connecting member 61 and the carrier bottom connecting member 291 are in the down position in the column device 51, the couplings of the holding member 63 and the holding member 195 with the container connecting members are released by the action of the projecting parts 63d and operating pins 200, and the action of the rod 92 and the operating pins 69. However, when the carrier top connecting member 61 and the carrier bottom connecting member 291 are in any position other than the down position, the holding member 63 and the holding member 195 are each closed by the coupling pin 65 and the connecting pin 196, respectively.

The container 201 and carrier 245 as described above operate as follows.

The carrier 245 and the container 201 are positioned as shown in FIG. 5(a) at the start of the loading operation with the bottom connecting member 216 in the up position and the support members 3 retracted inside the rear columns 5. In addition, the carrier top connecting member 61 and the carrier bottom connecting member 291 are both in the down position in the column device 51, and the holding members 63, 195 are therefore released. At this position, the U-shaped portion 63c of the holding member 63 of the carrier top connecting member 61 couples with the top connecting member 11 on the container, and the rectangular plate 117b of the engaging member 117 on the container bottom connecting member 216 couples with the U-shaped portion 195c of the holding member 195 in the carrier bottom connecting member 291. When the hydraulic cylinders 71 are extended as shown in FIG. 10(b), the ends of the piston rods 71a are supported by the seat 48, the tubes 71b rise, and the top sprocket 82 rises. Because the one end of the top chain 84 is fixed to the bridge 53, the lifting of the top sprocket 82 causes the carrier top connecting member 61 mounted on the other end to rise. The carrier bottom connecting member 291, however, remains at the down position in the columns 55. As the carrier top connecting member 61 and the carrier bottom connecting member 291 separate, the holding member 63 and holding member 195 are both automatically closed by the coupling pins 65, 196, respectively, and the carrier top connecting member 61 and the container top connecting member 11, and the carrier bottom connecting member 291 and the container bottom connecting member 216 are thus automatically coupled together. As shown in FIG. 5(b), the front of the container 201 is lifted via the container top connecting member 11 by the carrier top connecting member 61, and at the same time the back of the container 201 is lifted by the support members 3 as described below.

Specifically, because the container bottom connecting member 216 is held stationary with respect to the ground by the carrier bottom connecting member 291, when the container body 2 rises, the container bottom connecting member 216 descends relative to the container body 2. This action drives the chains 21 and 40, causing the support members 3 to extend down, thus lifting the back of the container 201. In other words, the front of the container 201 is lifted by the container top connecting member 11, and the back is lifted by the support members 3, this action is synchronized, and the container 201 thus remains level as it is raised 25 shown in FIG. 5(b).

When the main beam 32 at the bottom of the container body 2 reaches the same height as the subframe 47 of the carrier 245, the hydraulic cylinders 71 on the carrier stop operating. The column device 51 at this time is as shown in FIG. 10(b). Lifting action of the container 201 is stopped, the hydraulic motor 59 is driven, the column device 51 is moved forward, and the container 201 thus moves forward as shown in FIG. 5(c). At this time, the back of the container 201 is supported on the ground by the rollers 7 at the bottoms of the support members 3, and the front of the container 201 is pulled by the carrier top connecting member 61 and the carrier bottom connecting member 291 coupled to the container top connecting member 11 and the container bottom connecting member 216, respectively.

Figure 11:
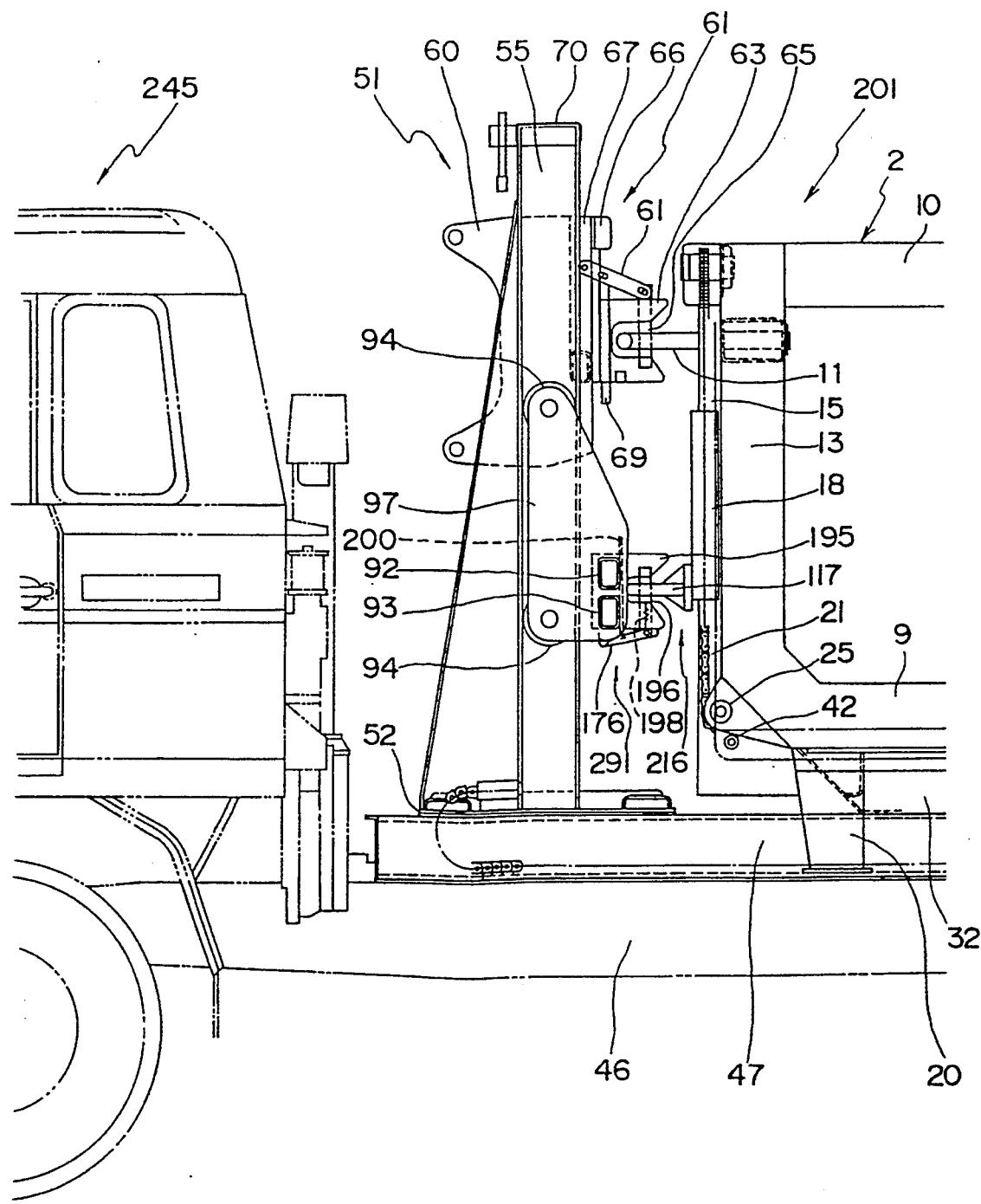
FIG. 11 is a side elevation view showing the container carrier when container loading is completed.

After horizontal movement of the container 201 is completed, the hydraulic cylinders 71 are retracted with the container 201 mounted on the carrier 245 as shown in FIG. 11. At this time, the carrier top connecting member 61 is held at the height of the container top connecting member 11 because it is coupled thereto. As a result, the hydraulic tubes 71b are constrained vertically and are held at the same height. Therefore, as shown in FIG. 10(c), the end of the piston rods 71a separate from the seat 48 of the chassis frame 46 and rise, and the carrier bottom connecting member 291 connected to the end of the piston rods 71a is thereby lifted. Then, as shown in FIG. 5(d), the container bottom connecting member 216 coupled to the carrier bottom connecting member 291 is lifted, and the support members 3 are raised from the ground via the chain 21 and the chain 40.

When the container 201 is unloaded from the carrier 245, this procedure is simply reversed.

As thus described, a container carrier according to the second embodiment of the present invention can load and unload a container 201 on and off the carrier 245 while holding the container 201 in a level position. Moreover, the carrier top connecting member 61 and container top connecting member 11, and the carrier bottom connecting member 291 and the container bottom connecting member 216 are automatically coupled and released during the loading and unloading action, and it is thereby possible to prevent any damage caused by the container dropping during loading and unloading.

It is to be noted that in both the first and second embodiments described hereinabove, the carrier top connecting member 61 and the container top connecting member 11, and the carrier bottom connecting member 91 or 291 and the container bottom connecting member 16 or 216 are each automatically coupled and decoupled, but the present invention is not thus limited as the carrier top connecting member 61 and container top connecting member 11 may also be manually coupled and decoupled.

Figure 12:
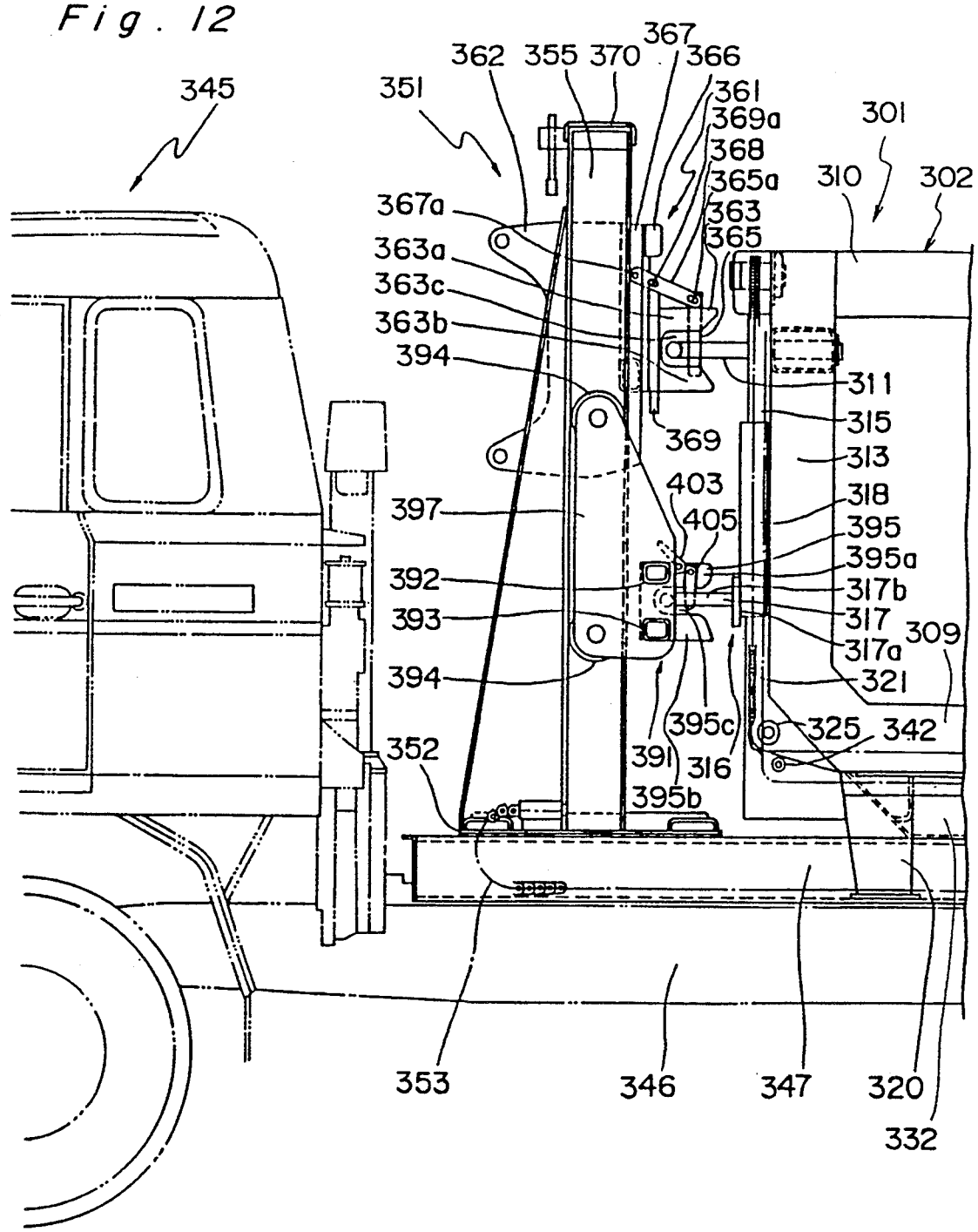
FIG. 12 and FIG. 13 are side views of a container carrier according to a third embodiment according to the present invention.
Figure 13:
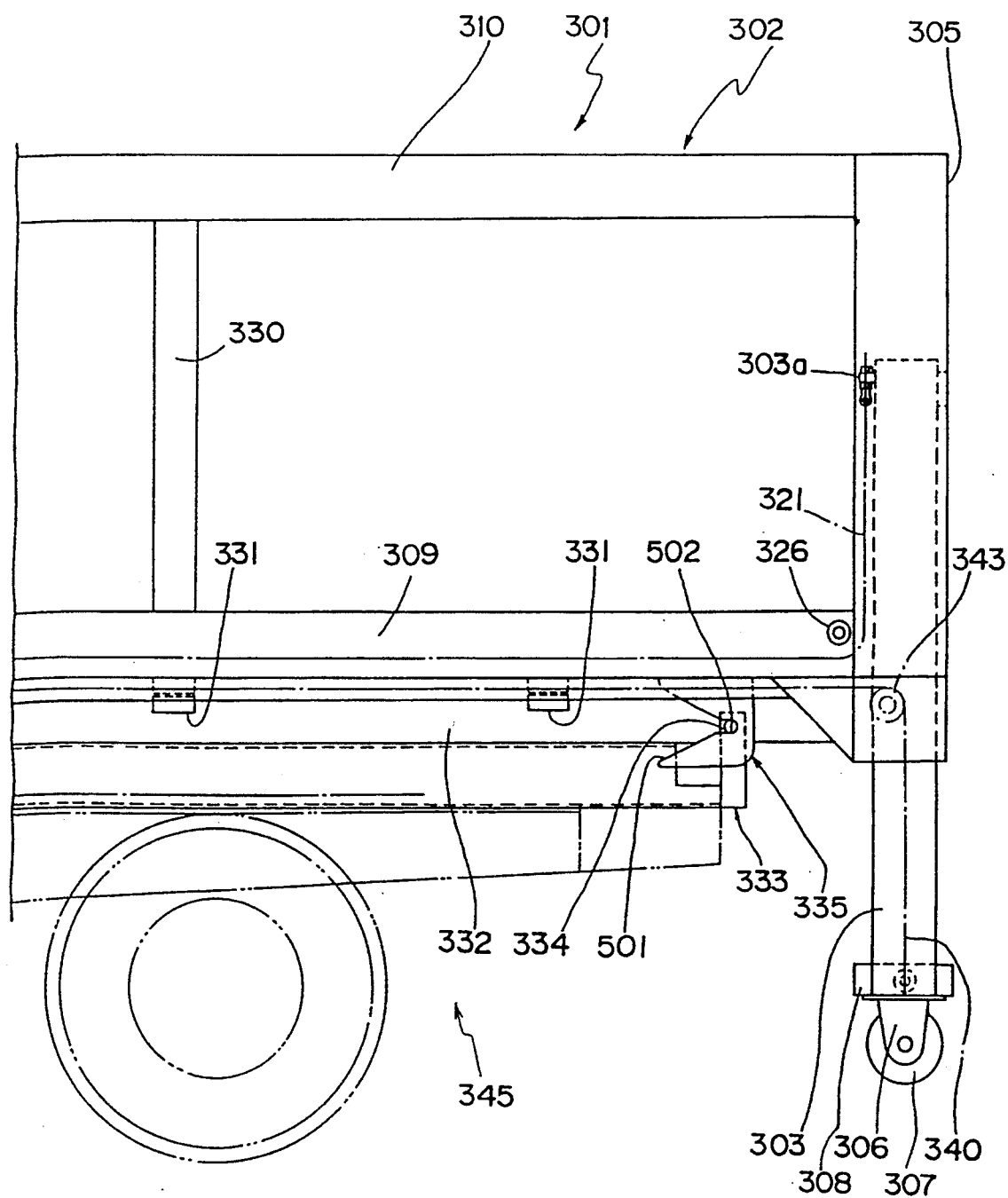

FIG. 12 and FIG. 13 show the container 301 and carrier 345 according to a third embodiment of the present invention.

The container 301 comprises a box-shaped container body 302, symmetrical pillar-shaped support members 303 as shown in FIG. 13, and as shown in FIG. 12 a top connecting member 311 on the container, a bottom connecting member 316 on the container, and chains 321, 340 as transmitting members.

The container body 302 is composed of symmetrical pillar-shaped rear columns 305, front columns 313, side columns 330, top side frames 310, bottom side frames 309, horizontal girders 331, main girders 332, legs 320, and beams and covering panels not shown in the figures. The support members 303 fit inside the rear columns 305 so that they can be raised and lowered freely, and are each provided with a roller 307 mounted on the bottom end by way of a bracket 306. The bottoms of these right and left support members 303 are connected by a single shaft 308, which causes both support members 303 to ascend and descend in unison. The top connecting member 311 of the container is a semicircular shaped member, and is attached horizontally at the upper center of the container body 302. The container bottom connecting member 316 consists of an engaging member 317, formed by a semicircular member 317b attached horizontally to a perpendicular rectangular plate 317a, and a channelled sliding member 318; the rectangular plate 317a of the engaging member 317 is mounted on the outside surface of the channel bottom of the sliding member 318. The container bottom connecting member 316 is able to slide vertically along the guides 315 provided at the front center of the container body 302. A pair of chains 321 is provided (shown on only one side in, the figure); one end of each chain is attached to the sliding member 318, and the chains 321 are led up and around a sprocket to the horizontal, from which they are passed over sprockets 324, 325, and 326, which conduct the chain down, horizontally along the length of the container, and then up, and the other end of the chains 321 is connected to the stud 303a of the support members 303.

The other chain 340 likewise has one end connected to the bottom of the engaging member 317, is passed vertically at the front of the container body 302, guided from the vertical to the horizontal lengthwise by the sprocket 342 provided at the front bottom of the container body 302, around the sprocket 433 provided at the back bottom of the container body 2, and the other end is connected to the shaft 308.

Therefore, by pushing the bottom connecting member 316 down from the position shown in FIG. 12, the support members 303 are extended down via the chain 321, and the other chain 340 is loosened, allowing the shaft 308 to descend, i.e., allowing the support members 303 to descend. Conversely, when the bottom connecting member 316 of the container is moved up from the down position, the support members 330 are lifted by the chain 340 via the shaft 308, and the other chain 321 is loosened to allow the support members to rise.

The carrier 345 is provided with channelled subframes 347 parallel to each other and with the channels facing the inside on the chassis frame 346. The column device 351 is positioned on the subframes 347 so that it can move freely back and forth. The column device 351 also comprises a pair of columns 355 made of H-channel steel; the tops of the columns are connected by horizontal plate 370, and the bottoms are connected by a bottom plate 352. This bottom plate 352 is connected to the pair of chains 353 which extend around the two pairs of sprockets provided on the right and left sides at the front and back of the chassis, and the shaft connecting the back sprockets is driven by means of a hydraulic motor not shown in the figure. Therefore, by driving this chain 353 by means of the hydraulic motor, the column device 351 can be moved freely along the length of the body.

In addition, a carrier top connecting member 361 and a carrier bottom connecting member 391 are also provided at the back of the columns 355 in such a way that they can move freely up and down. The carrier top connecting member 361 comprises a pair of plates 362 with an L-shaped cross section connected by a horizontal rod 366, a holding member 363 mounted on the vertical rod 367 which is connected to the center of the horizontal rod 366 in a T-shape, a coupling pin 365 which passes through and connects both sides of the holding member 363, arm 368 and operating pin 369. The holding member 363 is provided horizontally with the U-shaped portion 363c formed by the top part 363a and the bottom part 363b. The bottom part 363b of the holding member 363 forces the connecting plate 409, described hereinbelow, of the carrier bottom connecting member 391 down when the carrier top connecting member 361 and the carrier bottom connecting member 391 are vertically proximal. Studs 367a, 365a, and 369a are provided horizontally, respectively, at the top of the vertical rod 367, coupling pin 365, and operating pins 369. A round hole is provided in one end and oval holes are provided at the other end and at approximately the center of the arm 368; the arm 368 is mounted with one end rotating freely on the stud 367a, and the oval holes at the other end and the approximate center rotating freely and with play in the long direction on the studs 365a and 369a. When the operating pins 369 are forced up by the rod 392 on the carrier bottom connecting member 391 as will be described hereinbelow, the weight of the coupling pin 365 causes the arm 368 to rotate down pivoting on the studs 367a, thus connecting the parts 363a, 363b of the holding member 363; when the operating pins 369 are driven up by the rod 392, the lever action lifts the coupling pin 365 up from the holding member 363.

The carrier top connecting member 361 is constructed such that it can travel vertically between the right and left columns 355 along the inside of the channel in the columns 355 guided by rollers mounted at both the sides of the plates 362 but not shown in the figures.

Figure 14:
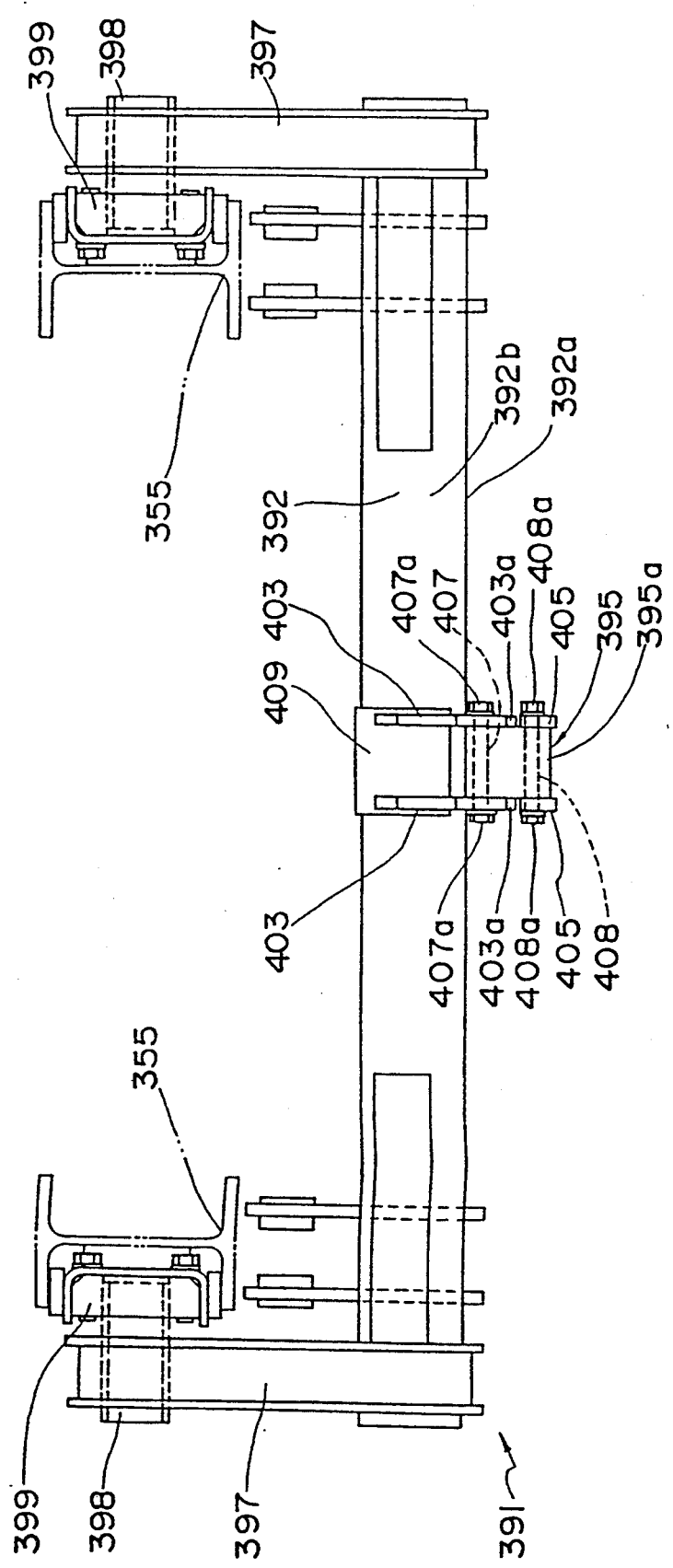
FIG. 14 and FIG. 15 are top and rear views, respectively, of the carrier bottom connecting member on the container carrier.
Figure 15:
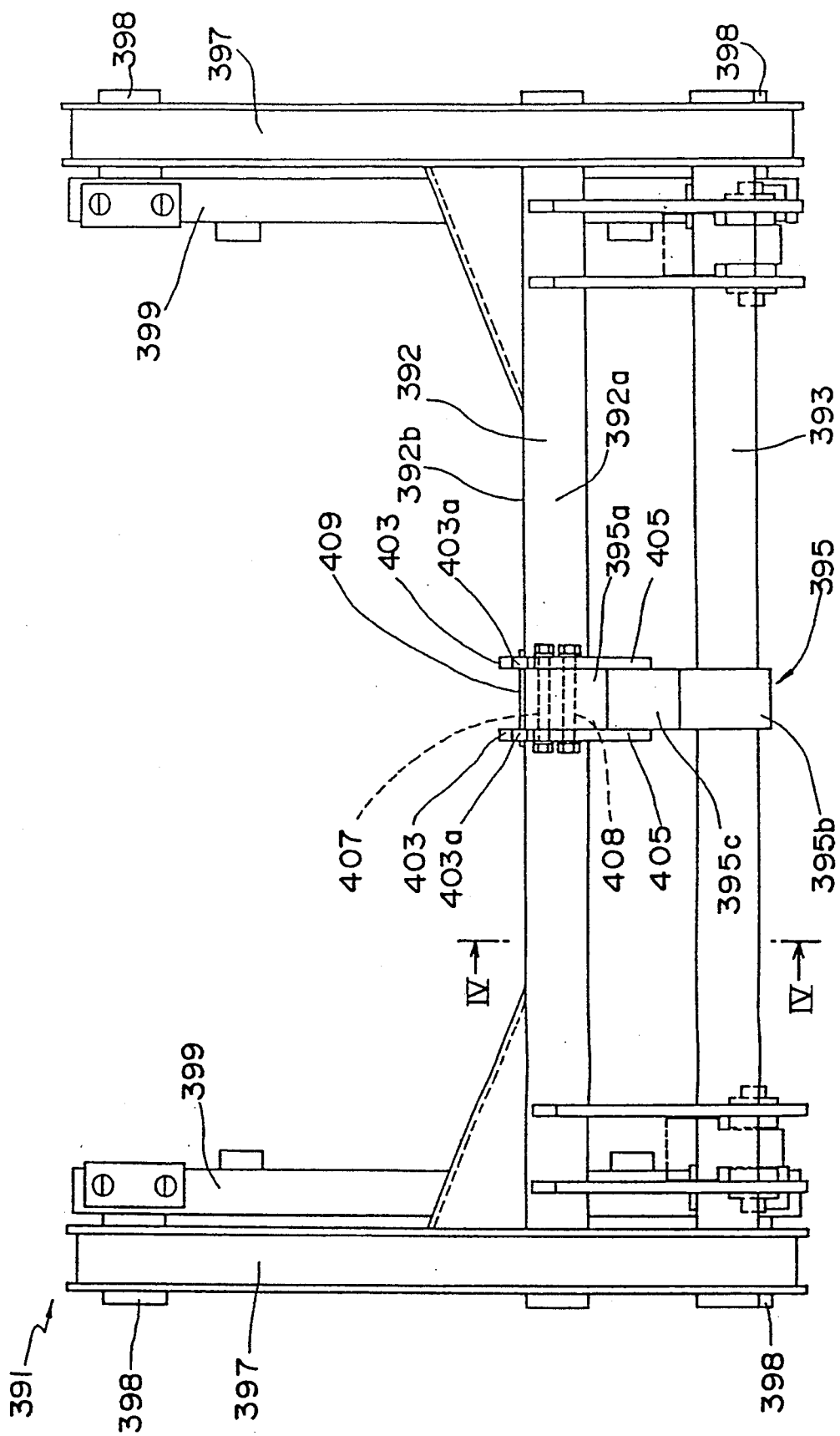
Figure 16:
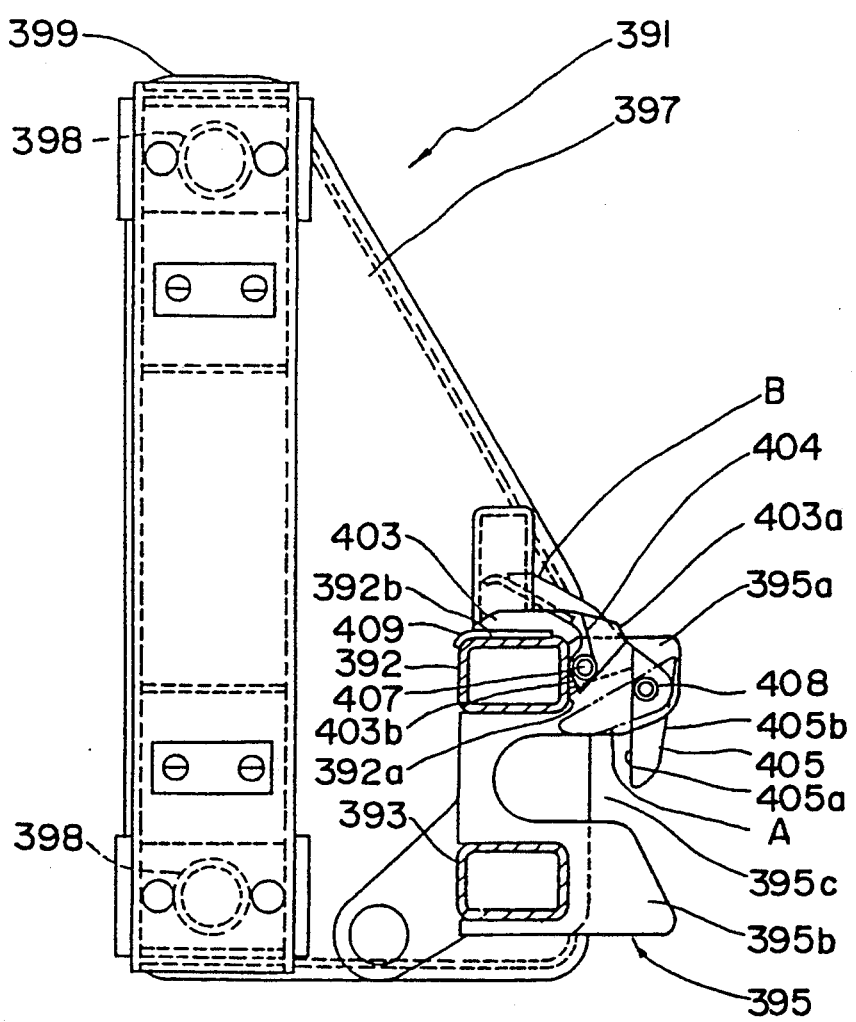
FIG. 16 is a cross section at 16—16 in FIG. 15.

FIG. 14 and FIG. 15 show the carrier bottom connecting member 391 from the top and back, respectively, and FIG. 16 shows the cross section on line 16—16 in FIG. 15.

The carrier bottom connecting member 391 comprises a pair of side plates 397 covering the sides of the columns 355; a pair of sliding members 399 attached to the side plates 397 via the connecting rods 398; a pair of top and bottom rods 392, 393 connecting the side plates 397 horizontally; and a holding member 395 at the center of the rods 392, 393. In addition, there is a pair of rotating members 403, a twist spring 404 as a force producing member, and a pair of locking members 405 mounted on the holding member 395.

The holding member 395 is provided with a U-shaped portion 395c formed by top part 395a and bottom part 395b, and is mounted between the connecting rods 392, 393 with the U-shaped portion 395c horizontal and facing out. The locking members 405 are long, narrow members comprising a straight side 405a and curved side 405b. The locking members 405 are mounted on stud 408, which passes horizontally through the top part 395a of the holding member 395 near the end, and are secured to the stud 408 by nuts 408a on both ends. The locking members 405 are able to rotate freely around the stud 408; when the locking members 405 are hanging perpendicularly of their own weight with the straight side 405a facing the connecting rod 392, at least part of the U-shaped portion 395c of the holding member 395 is closed. The rotating members 403 are approximately L-shaped members comprising a contact face 403a on the outside where the member bends in an L, and a contact face 403b at the end of the short leg of the L. These rotating members 403 are mounted on the ends of a stud 407, which passes horizontally through a point near the connecting rod 392 in the top part 395a of the holding member 395, and are secured by nuts 407a. With the rotating members 403 mounted at a point near the end of the short leg, a connecting plate 409 connecting the long legs of both rotating members 403 is provided so that the rotating members 403 turn around the stud 407 together. The rotating members 403 are also driven continuously around to the right by the force of the twist spring 404 as shown in FIG. 16.

When the carrier top connecting member 361 and the carrier bottom connecting member 391 contact vertically, the bottom part 363b of the holding member 363 pushes the connecting plate 409 downward and stops at the top surface 392b of the connecting rod 392, the rotating members 403 are not in contact with any part of the freely rotating locking members 405. Therefore, the locking members 405 are free to rotate around the stud 408, and the U-shaped portion 395c of the holding member 395 opens, i.e., the coupling is released. However, when the carrier top connecting member 361 and the carrier bottom connecting member 391 separate vertically and the bottom part 363b of the holding member 363 separates from the connecting plate 409, the rotating members 403 are turned around to the right by the action of the twist spring 404, the contact face 403b contacts the side 392a of the connecting rod 392 as an engaging part, and the clamp is stopped and coupled in the position shown in B in FIG. 16 (hereinafter the coupled position). In addition, when the rotating members 403 are in the coupled position, the contact face 403b contacts the straight side 405a of the locking members 405 at a point up from the stud 408. At this time, the locking members 405 are allowed to rotate to the right towards the position A in FIG. 16, but left rotation is prevented by the rotating members 403 i.e., the coupling is completed. Note that the carrier bottom connecting member is able to move up and down along the outside channels in the right and left columns 355 on the sliding members 399 provided inside the side plates 397.

Figure 17A:
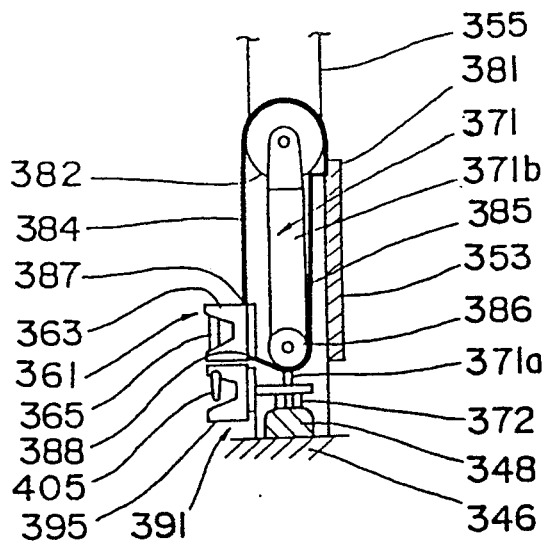
FIGS. 17(a), (b), and (c) are figures showing the operation of the column device on the container carrier.

As shown in FIG. 17(a), a pair of right and left hydraulic cylinders 371 is mounted inside the pair of columns 355 with the piston rods 371a pointing down, the top ends of the tubes 371b of the hydraulic cylinders 371 mounted on the top sprocket 382, and the bottom end of the tubes 371b mounted on the bottom sprocket 386. One end of the top chain 384 is connected to the top 387 of the plates 362, the top chain 384 is passed over the top sprocket 382 so that it descends vertically, and the other end is fixed to the mounting point 381 of the bridge 353 connecting the pair of columns 355 horizontally. In addition, the bottom chain 385, one end of which is fixed to the bottom 388 of the plates 362, is mounted on the bottom sprocket 386 and the other end is fixed to the mounting point 381 of the bridge 353.

Figure 17B:
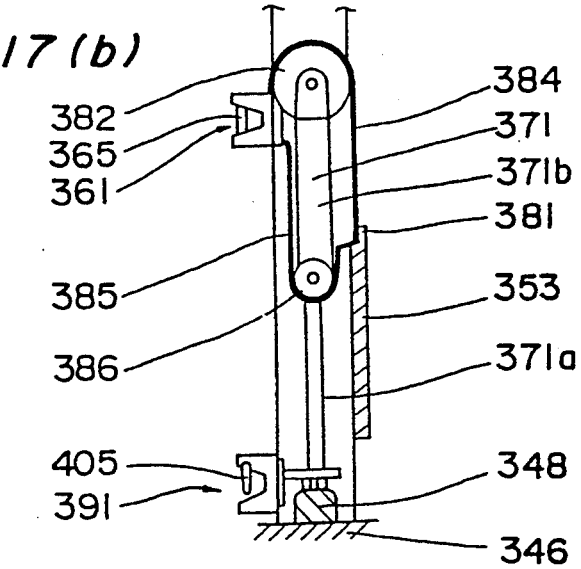
Figure 17C:
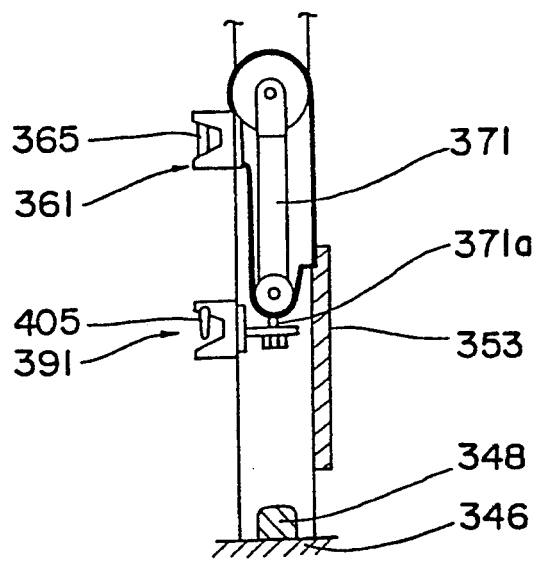

Thus, it is possible to extend the piston rods 371a of the hydraulic cylinders 371 so that the ends of the piston rods 371a contact the rubber seat 348 of the chassis frame 346 of the carrier 345, the tubes 371b move up, and the carrier top connecting member 361 is lifted up by the top chain 384 as shown in FIG. 17(b). In addition, by retracting the piston rods 371a, the tubes 371b and the carrier top connecting member 61 will descend of their own weight. As shown in FIG. 17(c), the carrier bottom connecting member 391 is connected to the piston rods 371a of the hydraulic cylinders 371 by a nut 372, thus causing the bottom connecting member 391 to be driven up and down according to the action of the piston rods 371a.

When thus assembled, the carrier top connecting member 361 and the carrier bottom connecting member 391 are vertically proximal only when they are both at the lowest position (hereinafter the down position) in the columns 355 as shown in FIG. 17(a), and when either one is at any position other than the down position as shown in FIG. 17(b) and (c), they are separated from each other according to the length of the tubes 371b and the piston rods 371a. Thus, when the carrier top connecting member 361 and the carrier bottom connecting member 391 are in the down position in the column device 351, the couplings of the holding member 363 and the holding member 395 are released by the action of the operating pins 369 and the connecting rod 392, and the bottom part 363b of the holding member 363 and the connecting plate 409. However, when the carrier top connecting member 361 and the carrier bottom connecting member 391 are in any position other than the down position, the holding member 363 and the holding member 395 are each closed by the coupling pin 365 and the locking members 405, respectively.

This container carrier is also provided with a guide portion 335 comprising a tapered guide portion 501 at the bottom back of the container body 302, and a horizontal contact part 502 which is connected to the tapered guide portion 501, and an engaging member 333 having a coupling pin 334 at the back of the carrier 345.

The container 301 and carrier 345 as described above operate as follows.

The carrier 345 and the container 301 are positioned as shown in FIG. 5(a) at the start of the loading operation with the bottom connecting member 316 in the up position and the support members 303 retracted inside the rear columns 305. In addition, the carrier top connecting member 361 and the carrier bottom connecting member 391 are both in the down position in the column device 351 as shown in FIG. 17(a), and the holding members 363, 395 are therefore released. At this position, the U-shaped portion 363c of the holding member 363 of the carrier top connecting member 361 couples with the top connecting member 311 on the container, and the engaging member 317 of the container bottom connecting member 316 is coupled with the U-shaped portion 395c of the holding member 395 in the carrier bottom connecting member 391. The holding member 363 easily couples with and separates from the container top connecting member 311, as the connecting pin 365 is released. Also, the engaging member 317 of the container bottom connecting member 316 fits in the U-shaped portion 395c of the holding member 395 in the carrier bottom connecting member 391. The locking members 405 of the carrier bottom connecting member 391 are not in contact with the rotating members 403 and simply swinging free of their own weight on the stud 408. It is therefore possible for the container bottom connecting member to easily fit into the U-shaped portion 395c of the holding member 395 by simply pushing the locking members 405 at the position shown by A in FIG. 16. Conversely, it is possible for them to separate from each other past the locking members 405.

When the hydraulic cylinders 371 are extended as shown in FIG. 17(b), the ends of the piston rods 371a are supported by the seat 348, the tubes 371b rise, and the top sprocket 382 rises. Because the one end of the top chain 384 is fixed to the bridge 353, the lifting of the top sprocket 382 causes the carrier top connecting member 361 mounted on the other end to rise. The carrier bottom connecting member 391, however, remains at the down position in the columns 355. As the carrier top connecting member 361 and the carrier bottom connecting member 391 separate, the operating pins 369 separate from the connecting rod 392, and the holding member 363 is automatically closed by the connecting pin 365. At the same time, the rotating members 403 approach the locking member 405, thus preventing the locking member 405 from rotating in the direction opening the U-shaped portion, and the holding member 395 is thus automatically closed by the locking members 405. In this way, the carrier top connecting member 361 and container top connecting member 311, and the carrier bottom connecting member 391 and the container bottom connecting member 316 are each automatically coupled.

As shown in FIG. 5(b), the front of the container 301 is lifted via the container top connecting member 311 by the carrier top connecting member 361, and at the same time the back of the container 301 is lifted by the support members 303 as described below.

Specifically, because the container bottom connecting member 316 is held stationary with respect to the ground by the carrier bottom connecting member 391, when the container body 302 rises, the container bottom connecting member 316 descends relative to the container body 302. This action drives the chain 321 and the chain 340, causing the support members 303 to extend down, thus lifting the back of the container 301. In other words, the front of the container 301 is lifted by the container top connecting member 311, and the back is lifted by the support members 303, this action is synchronized, and the container 301 thus remains level as it is raised as shown in FIG. 5(b).

When the main beam 332 at the bottom of the container body 302 reaches the same height as the subframe 347 of the carrier 345, the hydraulic cylinders 371 on the carrier stop operating. The column device 351 at this time is as shown in FIG. 17(b). The lifting action of the container 301 is stopped, the hydraulic motor is driven, the column device 351 is moved forward, and the container 301 thus moves forward as shown in FIG. 5(c). At this time, the back of the container 301 is supported on the ground by the rollers 307 at the bottoms of the support members 303, and the front of the container 301 is pulled by the carrier top connecting member 361 and the carrier bottom connecting member 391 coupled to the container top connecting member 311 and the container bottom connecting member 316, respectively.

Immediately before horizontal movement of the container 301 is completed, the tapered guide portion 501 of the guide portion 335 guides the pin 334 of the engaging member 333, and by lifting the body so that the top of the body connects with the bottom of the container 301, the pin 334 will be in contact with the contact part 502 of the guide portion 335 when the horizontal movement of the container 301 is completed. In other words, the container 301 and the carrier 345 are coupled between the center and back by the engaging member 333 and the guide portion 335. In addition, the front of the container 301 is coupled to the carrier 345 by the carrier top connecting member 366 and the container top connecting member 311, and the carrier bottom connecting member 391 and the container bottom connecting member 316. The container 301 is thus engaged with the carrier 345 at both the front and the back.

After horizontal movement of the container 301 is completed, the hydraulic cylinders 371 are retracted with the container 301 mounted on the carrier 345. At this time, the carrier top connecting member 361 is held at the height of the container top connecting member 311 because it is coupled thereto. As a result the hydraulic tubes 371b are constrained vertically and are held at the same height. Therefore, as shown in FIG. 17(c), the end of the piston rods 371a separate from the seat 348 of the chassis frame 346 and rise, and the carrier bottom connecting member 391 connected to the end of the piston rods 371a is thereby lifted. Then, as shown in FIG. 5 (d), the container bottom connecting member 316 coupled to the carrier bottom connecting member 391 is lifted, and the support members 303 are raised from the ground via the chain 321 and the chain 340.

When the container 301 is unloaded from the carrier 345, this procedure is simply reversed.

As thus described, a container carrier according to the third embodiment of the present invention can load and unload a container 301 on and off the carrier 345 while holding the container 301 in a level position. Moreover, the carrier top connecting member 361 and container top connecting member 311, and the carrier bottom connecting member 391 and the container bottom connecting member 316 are automatically coupled and released during the loading and unloading action, and it is thereby possible to prevent any damage caused by the container dropping during loading and unloading.

Furthermore, because a guide portion 335 having a tapered guide portion 501 and a horizontal contact part 502 connected to the tapered guide portion 501 is provided at the bottom back of the container body 302, and an engaging member 333 having a pin 334 is provided at the back of the carrier 345, the tapered guide portion 501 guides the pin 334 when the container 301 is loaded, and it is therefore possible to connect the bottom of the container body 302 and the top of the chassis frame 346. Also, because the contact part 502 contacts the pin 334 after the container 301 is loaded, the carrier 345 will not bounce up from the carrier 345 when bumps or holes in the road are hit while driving, and the driver can therefore relax while driving.

It is to be noted that in the present embodiment described hereinabove, the carrier top connecting member 361 and the container top connecting member 311, and the carrier bottom connecting member 391 and the container bottom connecting member 316 are each automatically coupled and decoupled, but the present invention is not thus limited as the carrier top connecting member 361 and container top connecting member 311 may also be manually coupled and decoupled.

Figure 18A:
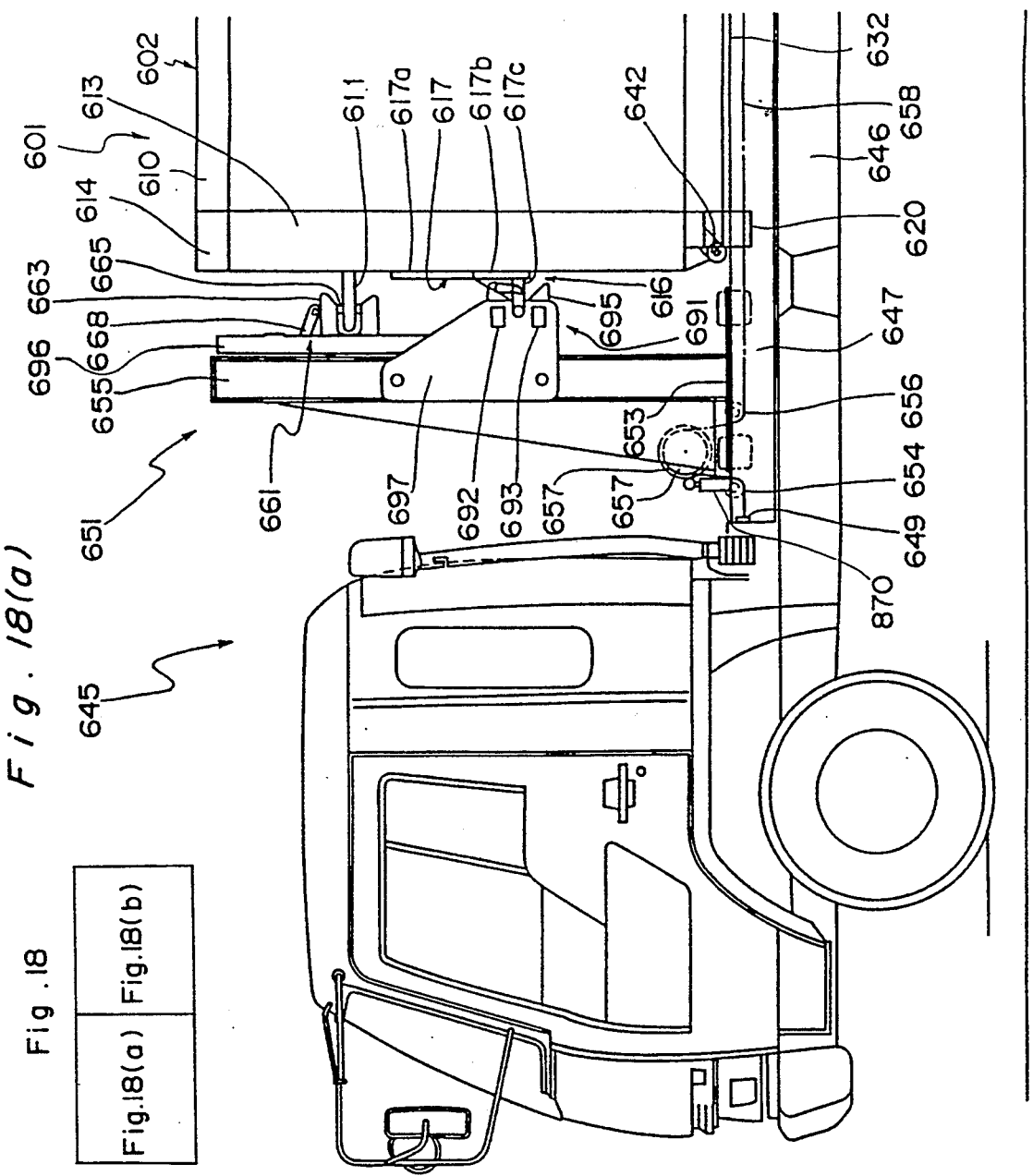
FIGS. 18(a) and (b) are side views of the front and rear of the container carrier according to a fourth embodiment of the present invention.

FIGS. 18(a) and (b) and 19–26 show the container 601 and the carrier 645 according to a fourth embodiment of the present invention.

Figure 19:
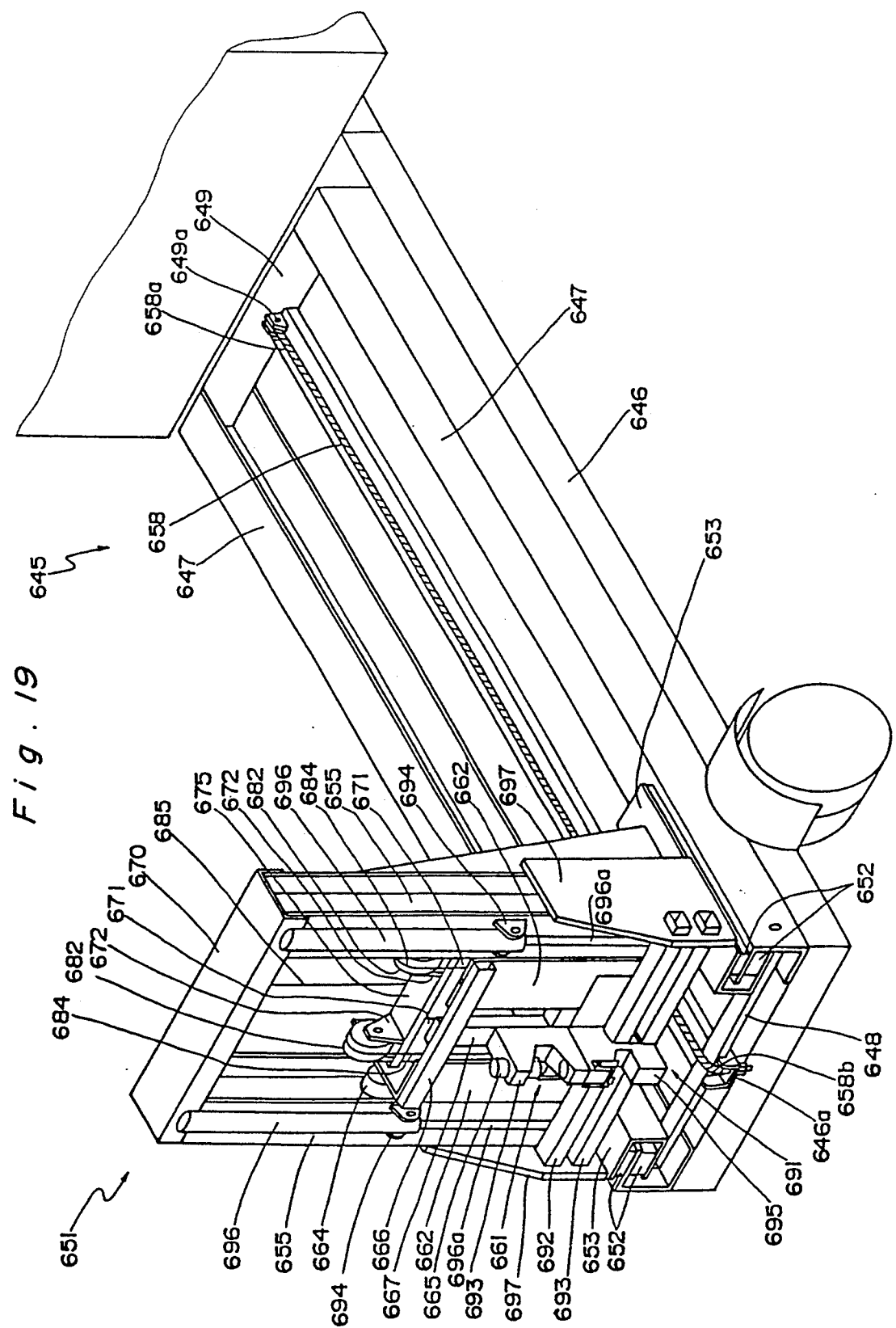
FIG. 19 is a perspective view of the carrier from the rear of this container carrier.
Figure 21:
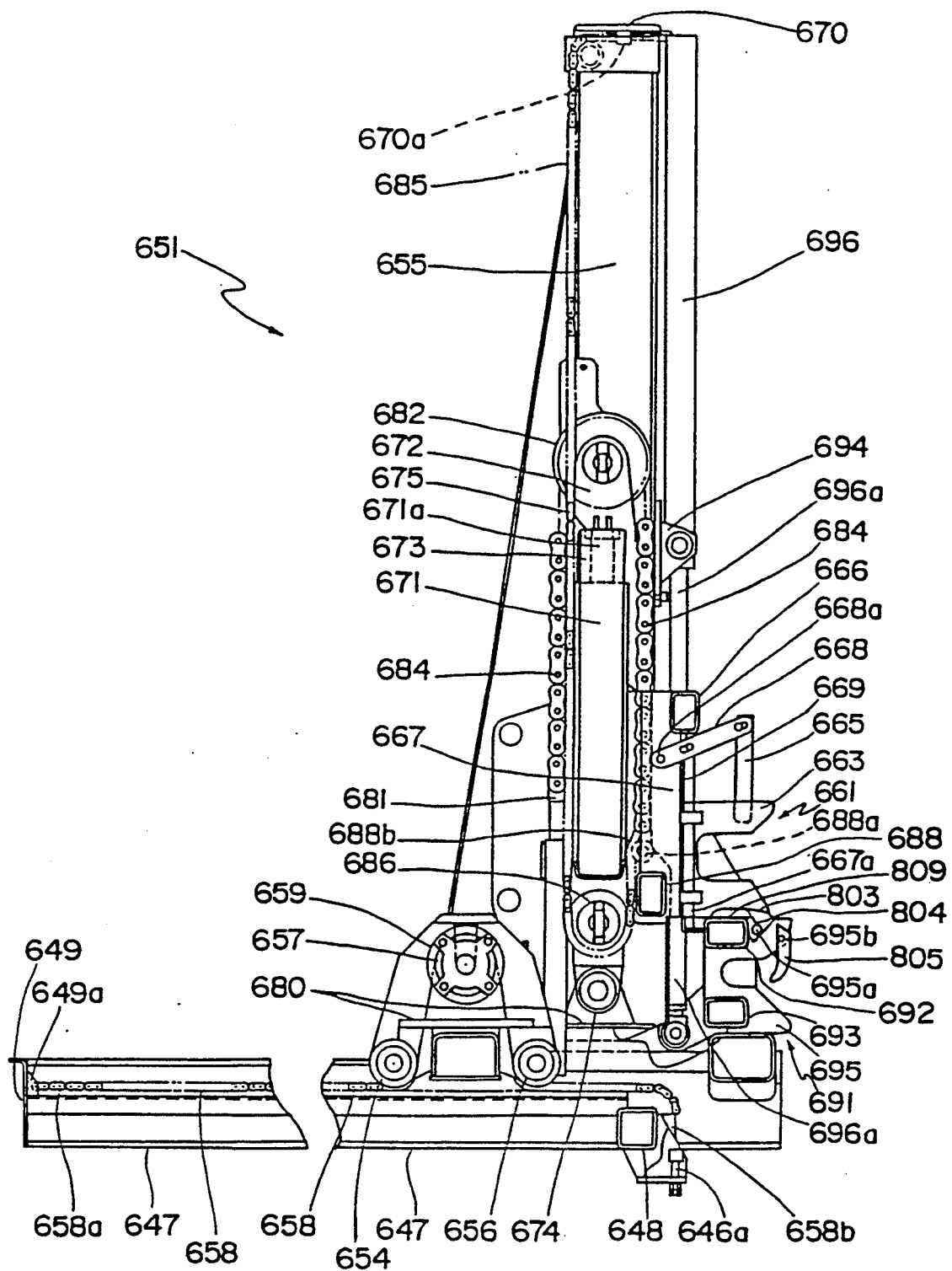
FIG. 21, FIG. 22, and FIG. 23 are views from the side, rear, and front, respectively, of the column device of this carrier.
Figure 22:
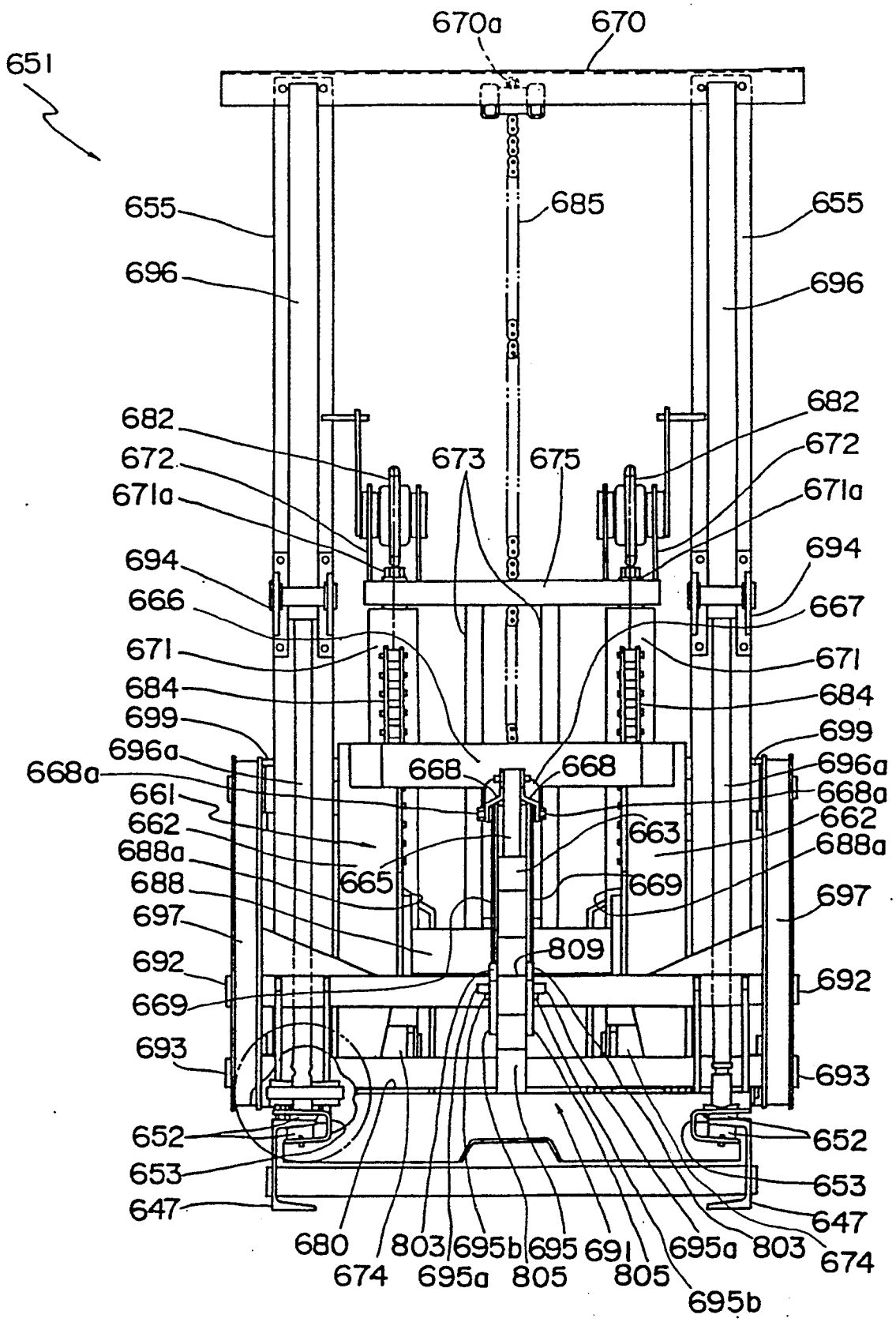
Figure 23:
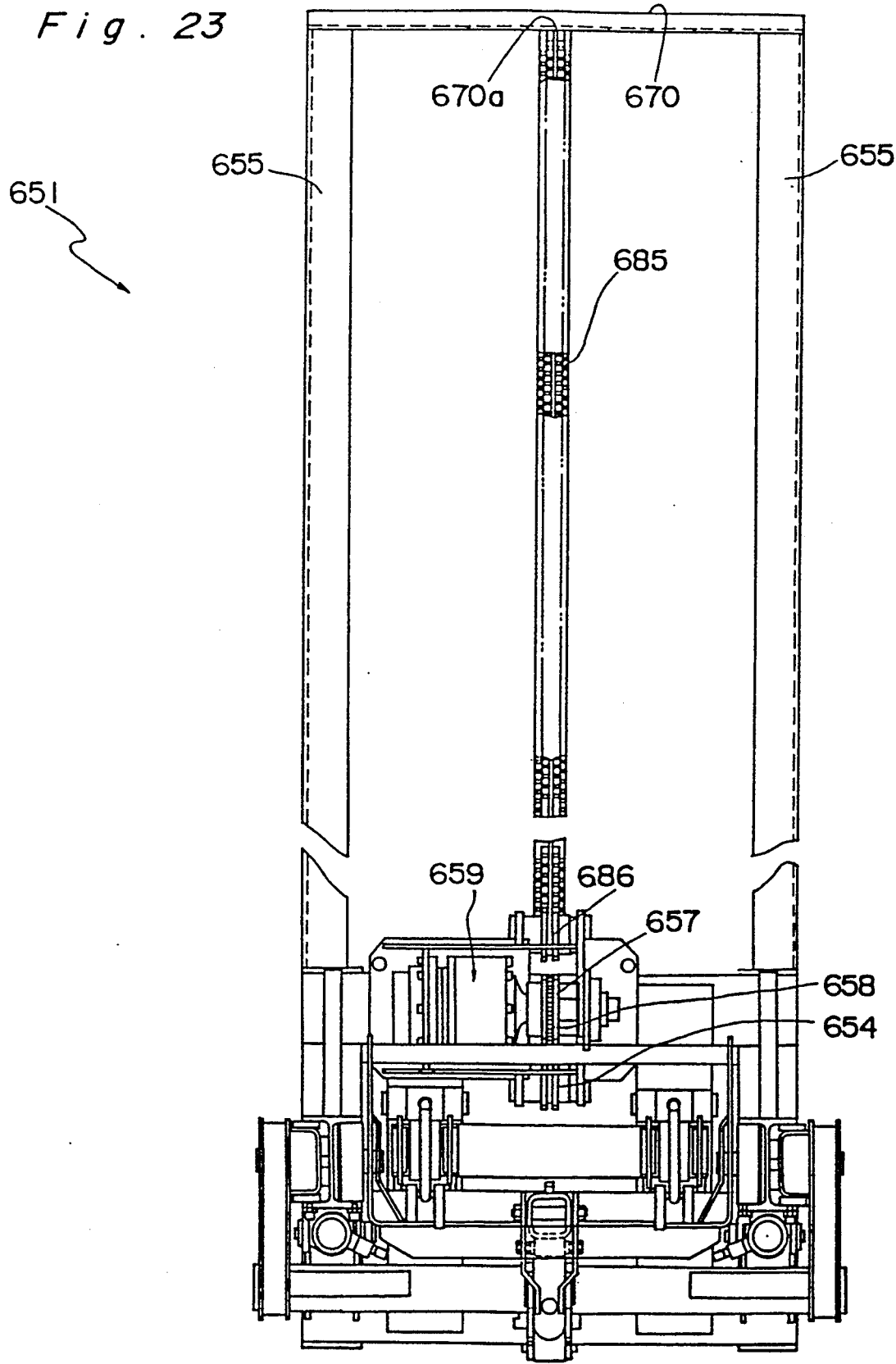

As shown in FIG. 19, this carrier 645 comprises parallel subframe members 647 made from a channel steel on the chassis frame 646 with the channels facing the inside and the subframe members 647 parallel to the length of the chassis frame 646. The column device 651 is mounted on the subframe members 647 so that it can move freely along the length of the vehicle in the direction forwardly and rearwardly thereof. FIGS. 21, 22, 23 are the side, back, and frontal views of this column device 651.

The column device 651 is such that it can slide along the top of the subframe members 647 on its slide pads 652, which sandwich the top rails of the subframe members 647. The column device 651 also comprises a pair of columns 655 made of H-channel steel resting on the channel steel 653; the tops of the columns 655 are connected by horizontal plate 670, and the bottoms are connected by a bottom plate 680 shown in FIG. 21. A hydraulic motor 659 is mounted on the bottom plate 680 in front of the columns 655; a sprocket 657 is mounted on the rotor of the hydraulic motor 659, and sprockets 654, 656 are provided before and after the sprocket 657 just below the bottom plate 680, i.e., at a level near the top of the subframe members 647. These three sprockets 654, 656, and 657 are connected by a single chain 658. The chain 658 has one end 658a fixed to the center portion 649a of the plate 649 connecting the front ends of the subframe members 647, and is passed lengthwise between the subframe members 647 up around the sprocket 654, and then down and back around sprockets 657, 656, respectively over the shaft 648 connecting the back ends of the sub-frame members 647, and the other end 658b is secured at the center portion 646a at the back of the chassis frame 646. The channel width between the subframe members 647 is the minimum required to allow passage of the chain 658, thereby making it possible to reduce the overall height of the carrier 645. By driving the hydraulic motor 659 in either direction, the column device 651 can be moved freely forward or back along the chain 658.

In addition, a carrier top connecting member 661 and a carrier bottom connecting member 691 are also provided at the back of the columns 655 in such a way that they can move freely up and down, respectively. The carrier top connecting member 661 comprises a pair of plates 662 with an L-shaped cross section connected at the top and bottom, respectively by horizontal rods 666, 688, a holding member 663 mounted on the vertical rod 667 connecting the centers of the horizontal rods 666, 688, a coupling pin 665 which passes through and connects both sides of the holding member 663, a pair of right and left arms 668, and operating pin 669. The holding member 663 is provided with a U-shaped portion facing the back. One end of the arms 668 is mounted with one end rotating freely on the studs 668a provided on vertical rod 667, and the other end and the approximate center of the arms 668 rotating freely and with play in the long direction on the coupling pin 665 and operating pin 669.

When the operating pin 669 is not forced up by the rod 692 at the carrier bottom connecting member 691 as will be described hereinbelow, the weight of the coupling pin 665 causes the arms 668 to rotate down pivoting on the studs 668a, thus closing the holding member 663; when the carrier top connecting member 661 and the carrier bottom connecting member 691 contact vertically and the operating pin 669 is driven up by the rod 692, this action causes the coupling pin 665 to rise and separate from the holding member 663, thereby opening the holding member.

A pair of hydraulic cylinders 671 is mounted inside the pair of columns 655 with the bottom ends of the tubes connected to the bottom plate 680 by pin 674, and the top ends of the piston rods 671a of the hydraulic cylinders 671 connected by shaft 675, to the ends of which are mounted sprockets 682. A pair of support members 673 is provided vertically at approximately the center of the shaft 675, and a sprocket 686 is mounted between the bottom ends of the support members 673. A pair of chains 684 attached near the bottom 681 of the tubes of the hydraulic cylinders 671 extend around the sprockets 682 and drop vertically, and are connected to the ends 688a of the horizontal rod 688 of the carrier top connecting member 651. A chain 685 fixed at center member 670a of the top plate 670 is wound around the sprocket 686 and carried up and is connected at the center part 688b of the horizontal rod 688.

Thus, when the piston rods 671a of the hydraulic cylinders 671 are extended, the sprockets 682, shaft 675, support members 673, and sprocket 686 all rise together, and the carrier top connecting member 661 is lifted up by the chains 684, and the carrier top connecting member 661 is permitted to rise with the chain 685 wrapped around and constrained by the sprocket 686. When the piston rods 671a of the hydraulic cylinders 671 are retracted, the carrier top connecting member 661 can descend of its own weight. It is to be noted that the carrier top connecting member 661 is mounted such that it can travel up and down along the channels inside and between the right and left columns 655 on the rollers 664 mounted on the sides of the plates 662.

The carrier bottom connecting member 691 comprises a pair of side plates 697 covering the sides of the columns 655, a pair of top and bottom rods 692, 693 horizontally connecting the side plates 697, and a holding member 695 mounted at the center of the rods 692, 693 In addition, there is a pair of rotating members 803, a twisted spring 804, and a pair of locking members 805 mounted to the holding member 695.

The holding member 695 is provided with a U-shaped portion horizontal and projecting out toward the back. The locking members 805 are mounted on stud 695b at the top end of the holding member 695 so that they are able to rotate freely around the stud 695b; when the locking members 805 are hanging perpendicularly of their own weight, at least part of the U-shaped portion of the holding member 695 is closed. The rotating members 803 are simple L-shaped members with that part corresponding to the short leg of the L mounted on a stud 695a provided at a point near the connecting rod 692 at the top side of the holding member 695. The rotating members 803 are provided with a connecting plate 809 connecting the long legs of both rotating members 803 so that the rotating members 803 turn around the stud 695a together, and are also urged continuously around to the right by the force of the spring 804 as shown in FIG. 21.

When the carrier top connecting member 661 and the carrier bottom connecting member 691 contact vertically, the holding member 663 pushes the connecting plate 809 downward and stops at connecting rod 692, and the rotating members 803 are not in contact with any part of the freely rotating locking members 805. Therefore, the locking members 805 are free to rotate around the stud 695b, and the U-shaped portion of the holding member 695 becomes open, i.e., the coupling effect is released. However, when the carrier top connecting member 661 and the carrier bottom connecting member 691 separate vertically and the holding member 663 separates from the connecting plate 809, the rotating members 803 are turned around to the right by the action of the spring 804, contact the side of the connecting rod 692, and are stopped. At this time, the locking members 805 are allowed to rotate to the clockwise as shown in FIG. 21, but counter-clockwise rotation is prevented by contact with the rotating members 803, i.e., the connecting member is locked. The carrier bottom connecting member 691 is connected to the bottom end of the piston rods 696a (pointing down) of the hydraulic cylinders 696 mounted on the back of the columns 655 by the bracket 694. Sliding members 699 are provided inside the side plates 697 so that when the piston rods 696a of the hydraulic cylinders 696 are retracted, the carrier bottom connecting member 691 can move up and down along the columns 655.

Figure 24:
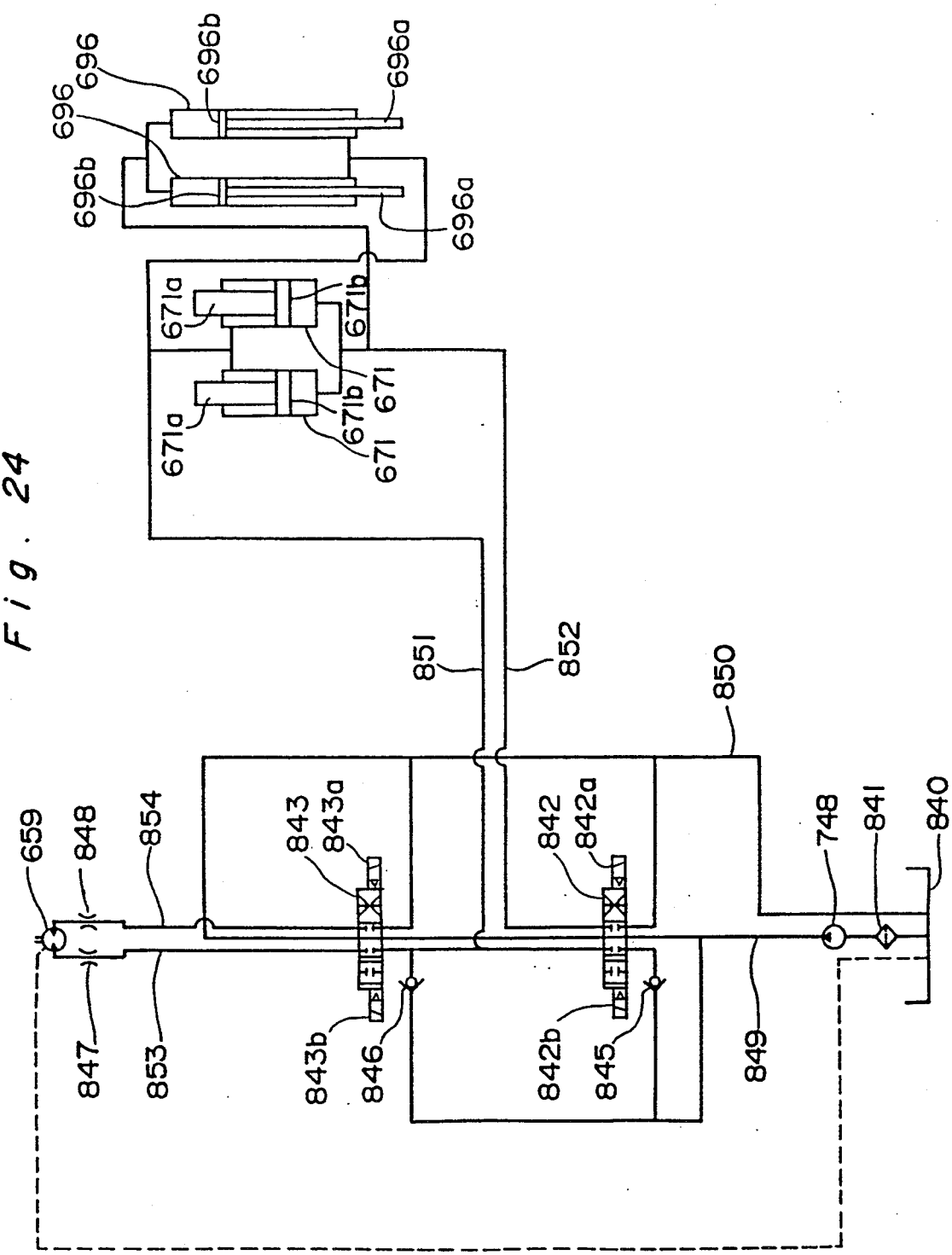
FIG. 24 is a circuit diagram of the hydraulic circuit of this carrier.

The hydraulic motor 659 on the column device 651, the hydraulic cylinders 671, and the hydraulic cylinders 696 are driven by a hydraulic circuit as shown in FIG. 24. This hydraulic circuit comprises a hydraulic pump 748, tank 840, filter 841, a six port, three position directional control valve 842 for driving the hydraulic cylinders, a similar six port, three position directional control valve 843 for driving the hydraulic motor, non-return valves 845, 846, and flow control valves 847, 848 connected to the ports of the hydraulic motor 659. The hydraulic pump 748 and tank 840 are mounted at the side of the chassis frame 646. The directional control valves 842, 843 are mounted inside the column device 651. The hydraulic cylinders 671, 696 are connected in parallel in the column device 651, and are connected to the ports of the directional control valve 842 by a pair of lines 851, 852; the flow control valves 847, 848 connected to the ports of the hydraulic motor 659 are connected to the ports of the directional control valve 843 by another pair of lines 853, 854. The directional control valves 842, 843 in the column device 651 are connected to the hydraulic pump 748 and tank 840 on the side of the chassis frame 646 by a pair of return lines 849, 950 to form one complete circuit.

The directional control valves 842, 843 are able to move a spool by means of solenoids 842a, 842b and 843a, 843b, respectively, to change the operating position; when current is applied to the solenoids 842a, 843a, an intersecting fluid path is formed, and when current is applied to the solenoids 842b, 843b, a direct fluid path is formed.

Figure 25:
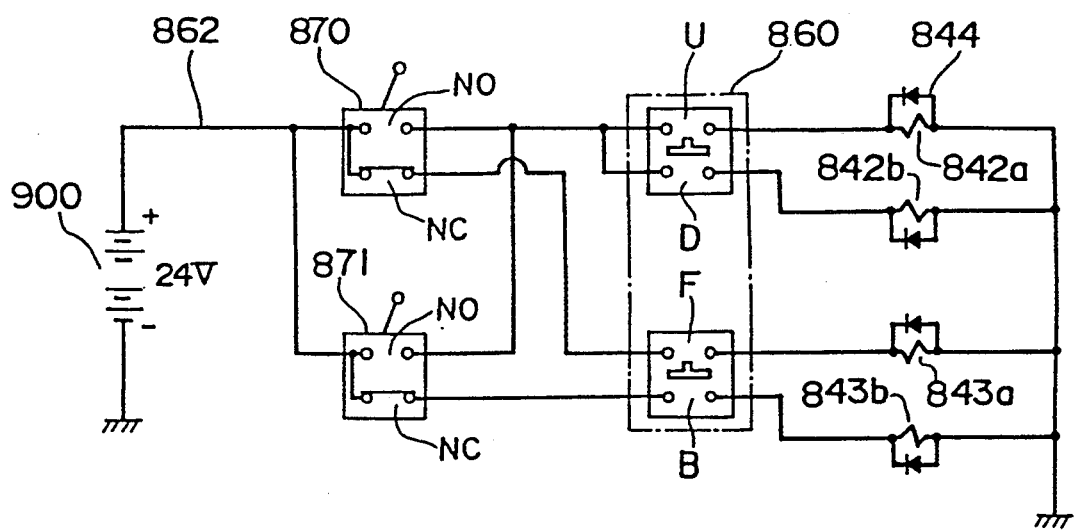
FIG. 25 is a circuit diagram of the electrical circuit of this carrier.

The solenoids 842a, 842b and 843a, 843b are controlled by an electrical circuit as shown in FIG. 25. This circuit comprises a 24-V battery 900, a limit switch 870 and a limit switch 871, each with a normally open contact NO and a normally closed contact NC, and an operating switch 860 with four normally open contacts U, D, F, B.

As shown in FIGS. 18(a) and (b), the limit switches 870, 871 are mounted at the front and rear, respectively, of the subframe members 647. When the column device 651 is at the front of the subframe members 647, the limit switch 870 contacts the front of the column device 651, and the normally open contact NO closes and the normally closed contact NC opens. When the column device 651 is at the back of the subframe members 647, the limit switch 871 contacts the back of the column device 651, and the normally open contact NO closes and the normally closed contact NC opens. The operating switch 860 is provided near the driver's seat, and the operator can close any of the contacts U, D, F, B as desired. The battery 900 is connected to the contacts NO, NC of both limit switches 870, 871; the normally open contacts NO of the limit switches 870, 871 are connected by a common wire to the contacts U, D of the operating switch 860. The normally closed contact NC of the limit switch 870 is individually connected to contact F of the operating switch 860, and the normally closed contact NC of the limit switch 871 is connected discretely to contact B of the operating switch 860. The contacts U, D, F, B of the operating switch 860 are respectively connected to the solenoids 842a, 842b, 843a, 843b. Thus, the limit switches 870 and 871 and the operating switch 860 are connected serially to each of the solenoids 842a, 842b, 843a, 843b. Note that each solenoid also has a serially connected diode 844 for circuit protection.

When the column device 651 is at the front of the subframe members 647, the normally open contact NO of the limit switch 870 is closed and the normally closed contact NC is open, and the normally open contact NO of the limit switch 871 is open and the normally closed contact NC is closed (the normal position). Thus, by closing contacts U, D, or B of the operating switch 860, current is applied to solenoids 842a, 842b or 843b, and current will not be supplied to solenoid 843a even if contact F is closed. In other words, the directional control valve 842 can be switched from a neutral position to the operating position at which an intersecting circuit or a direct circuit is formed, or the directional control valve 843 can be switched from a neutral position to the operating position at which a direct circuit is formed. However, it is not possible to switch the directional control valve 843 to the operating position at which a intersecting circuit is formed.

When the column device 651 is at the back of the subframe members 647, the limit switch 870 is in the normal position, but the limit switch 871 is set with the normally open contact NO closed and the normally closed contact NC open. Thus, by closing contacts U, D, or F of the opening switch 860, current is applied to solenoids 842a, 842b, or 843a, and current will not be supplied to solenoid 843b even if contact B is closed. In other words, the directional control valve 842 can be switched from a neutral position to the operating position at which an intersecting circuit or a direct circuit is formed or the directional control valve 843 can be switched from a neutral position to the operating position at which an intersecting circuit is formed. However, it is not possible to switch the directional control valve 843 to the operating position at which a direct circuit is formed.

When the column device 651 is at a midpoint position of the subframe members 647, both limit switches 870, 871 are in the normal position. Thus, by closing contacts F or B of the operating switch 860, current is applied to solenoids 843a or 843b, and current will not be supplied to solenoids 842a or 842b even if contacts U or D are closed. In other words, the directional control valve 843 can be switched from a neutral position to either operating position, but the directional control valve 842 cannot be switched from the neutral position to either operating position.

When both directional control valves 842, 843 are at the neutral position as shown in FIG. 24, the fluid sent from the tank 840 through the filter 841 by the hydraulic pump 748 to the line 849 passes through the directional control valves 842, 843, and is vented directly into the tank 840 through the line 850 connecting the directional control valve 843 and the tank 840. However, when current is applied to the solenoid 843b and the directional control valve 843 is in the operating position in which the direct circuit is formed, the fluid returns to the tank 840 successively through the non-return valve 846, directional control valve 843, line 853, flow control valve 847, hydraulic motor 659, flow control valve 848, line 854, and directional control valve 843, and the hydraulic motor 659 can thus be driven in either rotational direction. At this time, the column device 651 moves to the back with respect to the subframe members 647.

When current is applied to the solenoid 843a and the directional control valve 843 is in the operating position in which the intersecting circuit is formed, the flow of fluid through lines 853, 854 are the reverse to the above case, and the hydraulic motor 659 can be driven in the opposite direction. The column device 651 will move to the front of the subframe members 647 at this time.

When current is applied to the solenoid 842b and the directional control valve 842 is in the operating position in which the direct circuit is formed, the fluid flows through the non-return valve 845, directional control valve 842, and line 851 to the piston rods 671a, 696a in the tubes of the hydraulic cylinders 671, 696, thus pressurizing the cylinders in the direction causing the piston rods to simultaneously retract; when current is applied the solenoid 82a and the directional control valve 82 is in the operating position in which the intersecting circuit is formed, the fluid flows to the piston heads 671a, 696b, in the tubes of the hydraulic cylinders 671, 696, thus pressuring the cylinders in the direction causing piston rods 671a, 696a to simultaneously extend. Thus, the hydraulic motor 659 can be driven by the directional control valve 843, the hydraulic cylinders 671 and the hydraulic cylinders 696 can be driven by one directional control valve 842, and the two directional control valves 842, 843 can be controlled by a single operating switch 860.

Figure 20:
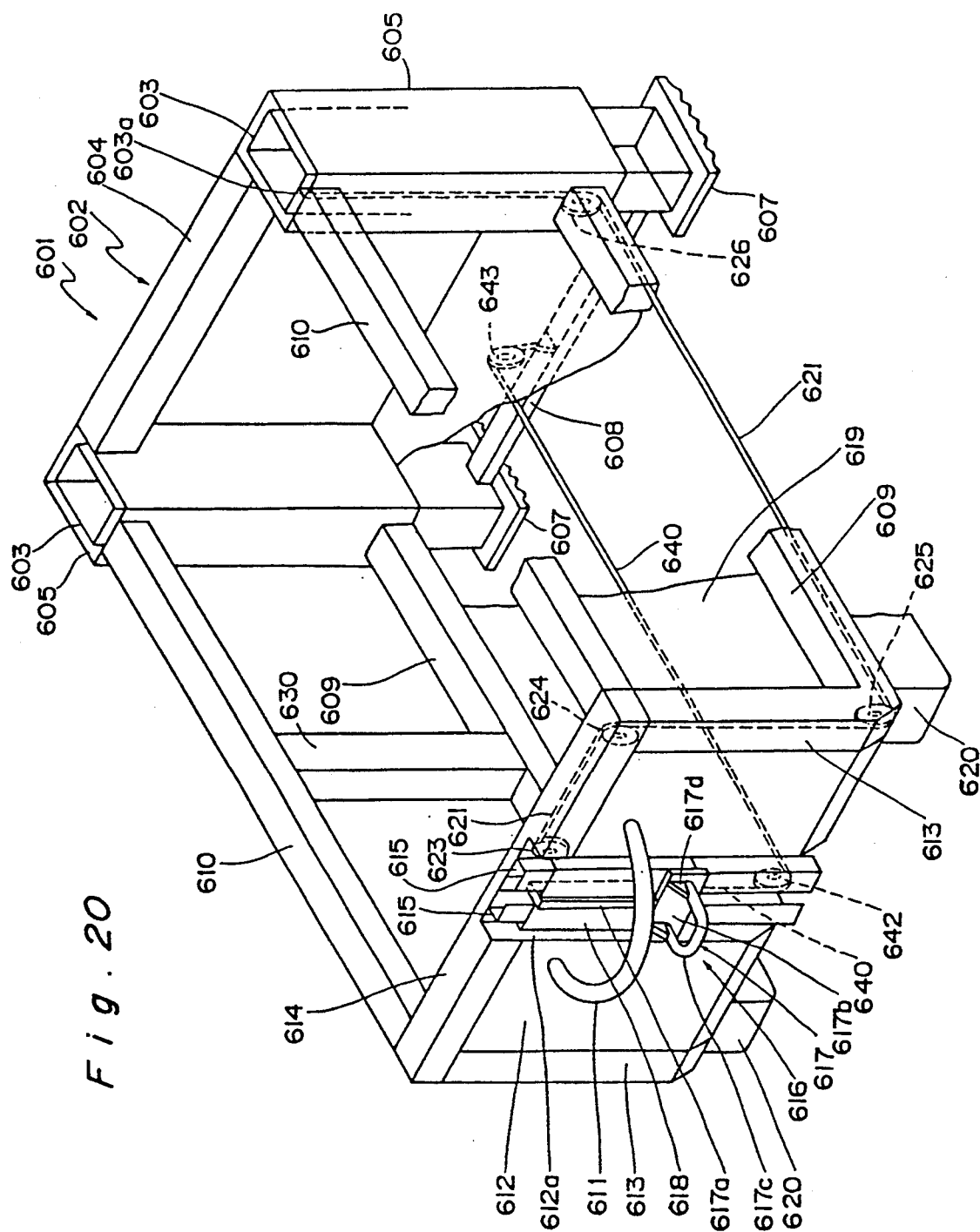
FIG. 20 is a perspective view of the container from the front of this container carrier.

As shown in FIG. 20, the container 601 comprises a box-shaped container body 602, pillar-shaped support members 603, a top connecting member 611 on the container, a bottom connecting member 616 on the container, and chains 621, 640. The container body 602 is composed of symmetrical pillar-shaped rear columns 605, front columns 613, side columns 630 (shown only on one side), rear beam 604, front beam 614, top side frames 610, bottom side frames 609, front panel 612, bottom panel 619, legs 620, and top and side panels not shown in the figure. A channel 612a with a U-shaped cross section running vertically is provided at the center of the front panel 612 and the front beam 614. The support members 603 fit inside the rear columns 605 so that they can be raised and lowered freely, and are each provided with a rectangular ground member 607 on the bottom. The bottoms of these support members 603 are connected by a single shaft 608, which causes both support members 603 to ascend and descend in unison. The top connecting member 611 of the container is a semicircular shaped member the ends of which are attached horizontally at the upper center of the front panel 612.

The container bottom connecting member 616 comprises a engaging member 617 and a sliding member 618. The engaging member 617 has a U-shaped portion 617c mounted to a vertical rectangular plate 617b perpendicular to the U-shaped portion 617c with reinforcing ribs 617d therebetween, and a vertical rectangular plate 617a perpendicular to the rectangular plate 617b.

Said container bottom connecting member 616 is constructed in such a way that the rectangular plate 617a of the engaging member 617 and the channel in the sliding member 618 intersect. A pair of guides 615 formed from channel steel are provided inside the channel 612a of the front beam 614 and front panel 612 with the channels facing inside and parallel to one another with a gap therebetween; the rectangular plate 617a of the engaging member 617 is fit into this gap, and the outside surface of the guides 615 slides in contact with the inside surface of the channel in sliding member 618. Thus, the container bottom connecting member 616 complete can be moved up and down.

A pair of chains 621 is provided symmetrically (shown only on one side in the figure) with one end connected to the side of the sliding member 618, the chain passing through the front beam 614 and extending over a pair of sprockets 623, 624 to guide the chain first horizontally from the up vertical and then down vertically from the horizontal, through the front column 613, around the sprocket 625 at the bottom of the front column 613 so that the chain is carried from the vertical horizontally to the back through the bottom side frame 609, around the sprocket 626 at the back end of the bottom side frame 609 from the front-back horizontal to the vertical, and the other end is connected to the top 603a of the support member 603. The other chain 640 likewise has one end connected to the bottom of the engaging member 617, is passed vertically at the front of the container body 602, guided from the vertical to the horizontal lengthwise by the sprocket 642 provided at the front bottom of the container body 602, underneath the bottom panel 619, around the sprocket 643 provided at the back bottom of the container body 602, and the other end is connected to the shaft 608.

Therefore, by pushing the bottom connecting member 616 down from the position shown in the figure, the support members 603 are extended down via the chain 621, and the other chain 640 is loosened, allowing the shaft 608 to descend, i.e., allowing the support members 603 to descend. Conversely, when the bottom connecting member 616 of the container is moved up from the down position, the support members 603 are lifted by the chain 640 via the shaft 608, and the other chain 621 is loosened to allow the support members to rise.

The container 601 and carrier 645 as described above operate as follows.

Figure 26A:
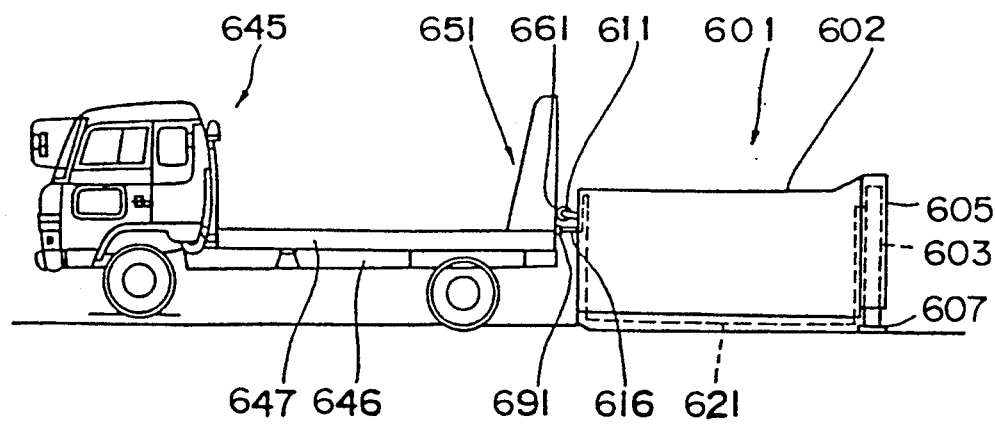
FIGS. 26(a) to (d) show the operation of loading the container to the carrier.

The carrier 645 and the container 601 are positioned as shown in FIG. 26(a) at the start of the loading operation with the column device 651 at the back of the subframe members 647, and the bottom connecting member 616 in the up position with the support members 603 retracted inside the rear columns 605. Also, the piston rods 671a of the hydraulic cylinders 671 are retracted, and the piston rods 696a of the hydraulic cylinders 696 are extended. The carrier top connecting member 661 and the carrier bottom connecting member 691 are in contact at lowest position in the column device 651, and the holding members 663, 695 are therefore released. In addition, the operating switch 860 shown in FIG. 25 is in the normal state, and the directional control valves 842, 843 shown in FIG. 24 are both at the neutral position. At this position, the U-shaped portion of the holding member 663 of the carrier top connecting member 661 couples with the top connecting member 611 on the container. This coupling is easily completed because the coupling pin 665 is in the separated (raised) position. The engaging member 617 of the container bottom connecting member 616 also couples with the U-shaped portion of the holding member 695 on the carrier bottom connecting member 691. Because the locking members 805 of the carrier bottom connecting member 691 are simply hanging of their own weight and can rotate freely, this coupling can also be easily completed as with the carrier top connecting member 661.

Next, when an operation is performed closing the contact U of the operating switch 860, the directional control valve 842 switches to the intersecting channel operating position. Current is thus supplied to the solenoid 842a because the normally open contact NO of the limit switch 871 at the back of the subframe members 647 is on at this time. Thus, the piston rods 671a of the hydraulic cylinders 671 are extended, and the carrier-side top connecting member 661 is raised by the chains 684 complete with the sprockets 682. Note that the bottom of the sprocket 686 is constrained by the chain 685. Also, the carrier bottom connecting member 691 remains stopped at the bottom of the columns 655 because this operation of the operating switch 860 causes the piston rods 696a of the hydraulic cylinders 696 to remain extended simultaneously. When the carrier top connecting member 661 rises and separates from the carrier bottom connecting member 691, the holding member 663 is automatically closed by the coupling pin 665, and the holding member 695 is automatically closed by the locking members 805, i.e., the carrier top connecting member 661 and the container top connecting member 611, and the carrier bottom connecting member 691 and the container bottom connecting member 616 are automatically coupled.

The front of the container 601 is lifted via the container top connecting member 611 by the carrier top connecting member 661, and at the same time the back of the container 601 is lifted by the support members 603 as described below.

Figure 26B:
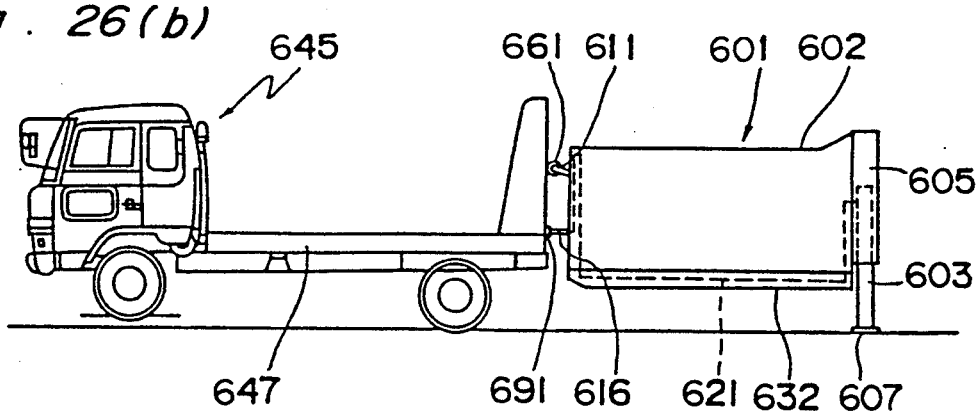

Specifically, because the container bottom connecting member 616 is held stationary with respect to the ground by the carrier bottom connecting member 691 which is at rest, when the container body 602 rises, as shown in FIG. 26(b), the container bottom connecting member 616 descends relative to the container body 602. This action drives the chain 621 and the chain 640, causing the support members 603 to extend down, thus lifting the back of the container 601. In other words, the front of the container 601 is lifted by the container top connecting member 611, and the back is lifted by the support members 603, this action is synchronized, and the container 601 thus remains level as it is raised.

Figure 26C:
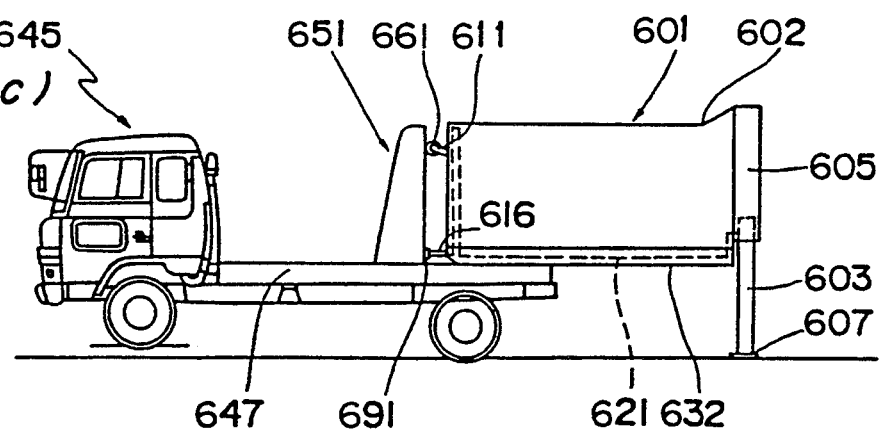

When the main beam 632 at the bottom of the container body 602 reaches the same height as the carrier 645 subframe 647, the operating switch 860 returns to the normal state, the directional control valve 842 returns to the neutral position, the operation of the hydraulic cylinder 671 stops, and lifting of the container stops. Next, the carrier 645 brake is released and the transmission is put into neutral; an operation is then performed whereby the contact F of the operating switch 860 is closed, thus supplying current to the solenoid 843a and switching the directional control valve 843 to the operating position forming an intersecting circuit. The hydraulic motor 659 on the column device 651 is then driven to move the column device 651 forward relative to the subframe members 647. At this time, because the back of the container 601 remains supported by the bottom ground member 607 on the end of the support members 603 and does not move horizontally relative to the ground, the carrier 645 is pulled back by the chain 658 and moves under the container as shown in FIG. 26(c).

If during this horizontal movement the operator works the operating switch 860 causing the contacts U or D to operate, the directional control valve 842 does not change its operating position because both the limit switches 870, 871 at the front and back of the subframe members 647 are in the normal state. Therefore, the hydraulic cylinders 671, 696 are not driven, and the front and back of the container 601 remain at the same height.

Figure 26D:
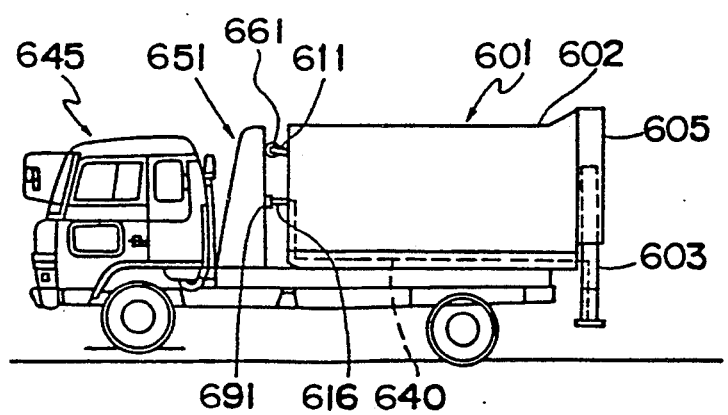

After horizontal movement of the carrier 645 is completed and the container 601 is loaded on the carrier 645, an operation is performed whereby contact D of the operating switch 860 is closed, thus causing the directional control valve 842 to switch to the direct current operating position. It is to be noted that because the normally open contact NO of the limit switch 870 at the front of the subframe members 647 is on at this time, current can be supplied to the solenoid 842b, and the directional control valve 842 can be switched. The piston rods 696a of the hydraulic cylinders 696 are retracted and the carrier bottom connecting member 691 is lifted. The piston rods 671a of the hydraulic cylinders 671 are also remain retracted at this time because the carrier top connecting member 661 is connected to the container top connecting member 611, and the piston rods 671a are held at the height of the container top connecting member 11. Thus, the sprockets 682 are constrained vertically by the chains 685 and chains 684, and are also held at the same height. As a result, while the operation of the operating switch 860 applies hydraulic pressure to the piston rods 671a of the hydraulic cylinders 671 which should cause the piston rods 671a to retract, they remain extended. Then, as shown in FIG. 26(d), the container bottom connecting member 616 connected to the carrier bottom connecting member 691 is raised, and the support members 603 are raised from the ground by the chains 621, 640. It is to be noted that the container 601 can be unloaded from the carrier 645 by simply reversing this procedure.

As thus described, a container carrier according to the embodiment of the present invention can load a container on and unload a container 601 from the carrier 645 while holding the container 601 in a level position. Moreover, the carrier top connecting member 661 and container top connecting member 611, and the carrier bottom connecting member 691 and the container bottom connecting member 616 are automatically coupled and released with the loading and unloading action. In addition, because the carrier 645 is pulled back by chain 658 during the loading operation by driving the hydraulic motor 659 on the column device 651 with the transmission in neutral, it is easy to control the speed of movement and to slow the horizontal movement. By slowing the horizontal movement, it is possible to prevent the carrier 645 and the container 601 from colliding hard and being damaged.

Furthermore, because the column device 651 can be moved forward and back along a single chain 658 positioned between the subframe members 647 on the chassis frame 646, the channel width between the subframe members 647 is the minimum required to allow passage of the chain 658, and by thereby making this channel as shallow as possible, the overall height of the carrier 645 can be reduced.

Furthermore, because the hydraulic motor 659 which moves the column device 651 forward and back, the hydraulic cylinders 671 which move the carrier top connecting member 661 up and down, and the hydraulic cylinders 696 which move the carrier bottom connecting member 691 up and down are provided together with the directional control valves 842, 843 on the column device 651, a single hydraulic circuit can be completed with the lines 849, 850 from the hydraulic pump 748.

In addition, because the hydraulic cylinders 671 and hydraulic cylinders 696 are connected in parallel and are controlled by the same directional control valve 842, operational errors caused by selecting the wrong hydraulic cylinder to be driven when moving the carrier top connecting member 661 and the hydraulic cylinders 696 up and down can be prevented.

Moreover, because limit switches 870, 871 which are on when the column device 651 is positioned at the front or the back of the subframe members 647 are provided at the front and the back of the subframe members 647, and the operating switch 860 controlling the switching of the directional control valve 842 is connected in series with the limit switches 870 and 871, a change in the height of the front or the back of the container 601 can be prevented even if the operator mistakenly operates the operating switch 860 during horizontal movement of the container 601 relative to the carrier 645. Therefore, it is possible to prevent the container 601 from tilting, and it is thus possible to prevent the contents of the container 601 from falling over.

APPLICATIONS IN INDUSTRY

The container and container carrier according to the present invention make it possible to load and unload a container safely and unfailingly while retaining a level attitude, and can therefore be used for the transportation of pianos, furniture, breakables, containers holding fluids or liquids, and other similar goods.

What is claimed:

1. A container and a container carrier with a chassis frame comprising:
   a subframe adapted to be mounted on said chassis frame;
   a column device mounted on said subframe for movement forward and back;
   a column moving means for moving said column device forward and back on said subframe;
   a carrier top connecting member mounted on said column device for movement vertically;
   a container loadable onto said container carrier and having a container top connecting member thereon with which said carrier top connecting member is engageable, whereby the carrier top connecting member can pull the container top connecting member and container up and down as well as pull and push the container top connecting member horizontally;

a carrier bottom connecting member mounted on said column device for movement vertically and in substantial vertical alignment with said carrier top connecting member, said container having a container bottom connecting member movable up and down on the container and with which said carrier bottom connecting member is engageable, whereby the carrier bottom connecting member can pull the container bottom connecting member up and down as well as pull and push the container bottom connecting member and container horizontally;

a lift chain, one end of which is fixed to said carrier top connecting member and the other end of which is connected to said column device;

a lift sprocket around a portion of which is wound said lift chain.

a first fluid piston-cylinder device connected to said lift sprocket for raising and lowering said lift sprocket by the extension and contraction of said first piston-cylinder device and having a piston-piston rod part and a cylinder part, one of said parts being a movable part connected to said lift sprocket and the other part being a fixed part;

a subsprocket connected to the movable part of said first piston-cylinder device;

a second fluid piston-cylinder device connected to said carrier bottom connecting member for raising and lowering said carrier bottom connecting member by the contraction and extension of said second piston-cylinder device;

fluid conveying lines connecting said first fluid piston-cylinder device and said second fluid piston-cylinder device in parallel;

a single control valve in said fluid conveying lines selectively operable in a first position for directing the flow of fluid in a first direction causing said first fluid piston-cylinder device to extend and said second fluid piston-cylinder device to extend simultaneously in an opposite direction from the direction in which said first fluid piston-cylinder device expands and selectively operable in a second position for directing the flow of fluid in a second direction causing said first and second fluid piston devices to contact; and a subchain, one end of which is fixed to the top of said column device and the other end of which is fixed to said carrier top connecting member, and which is wound around a portion of said subsprocket;

whereby when said valve is in one of said first or second positions said first fluid piston-cylinder device and said second fluid piston-cylinder device are driven for loading the container on the subframe, said carrier top connecting member is engaged with the container top connecting member to lift the container to a selected raised position while the carrier bottom connecting member is engaged with the container bottom connecting member, and causes the container bottom connecting member to be raised relative to the container, and when the control valve is selectively operated in another one of said first and second positions to direct fluid in a second direction which would normally cause the first and second fluid piston-cylinder devices to be driven, the movement of the first fluid piston-cylinder device is constrained by the engagement of the carrier top connecting member with the container top connecting member, and the carrier top connecting member is temporarily held and the carrier bottom connecting member is raised to raise the container bottom connecting member.

2. A container carrier as claimed in claim 1 further comprising:

a limit switch means engaged by said column device when said column device is positioned at the back of the subframe for operation of said single control valve for operating said first and second fluid piston-cylinder devices when said column device is at the back of said subframe when the limit switch means is engaged by said column device.

* * * * *

UNITED STATES PATENT AND TRADEMARK OFFICE
CERTIFICATE OF CORRECTION

PATENT NO. : 5,395,201
DATED : March 7, 1995
INVENTOR(S) : Megumi YAMASHITA et al.

It is certified that error appears in the above-indentified patent and that said Letters Patent is hereby corrected as shown below:

On the title page: Item

--[30]  Foreign Application Priority Data

July 12, 1989  Japan 1-180766

August 23, 1989  Japan 1-217135

Signed and Sealed this

Eighteenth Day of July, 1995

Attest:

BRUCE LEHMAN

*Attesting Officer*         *Commissioner of Patents and Trademarks*